(12) United States Patent
Leavey

(10) Patent No.: US 10,202,777 B1
(45) Date of Patent: Feb. 12, 2019

(54) SECUREMENT DEVICES FOR SECURING MOLDING TO A SURFACE, AND METHODS OF SECURING MOLDING TO A SURFACE

(71) Applicant: Dennis Leavey, Monroe, WA (US)

(72) Inventor: Dennis Leavey, Monroe, WA (US)

( * ) Notice: Subject to any disclaimer, the term of this patent is extended or adjusted under 35 U.S.C. 154(b) by 0 days.

(21) Appl. No.: 15/671,601

(22) Filed: Aug. 8, 2017

(51) Int. Cl.
*E04F 19/04* (2006.01)
*F16B 5/07* (2006.01)
*F16B 5/12* (2006.01)

(52) U.S. Cl.
CPC ...... *E04F 19/0463* (2013.01); *E04F 19/0436* (2013.01); *E04F 19/0495* (2013.01); *F16B 5/07* (2013.01); *F16B 5/123* (2013.01); *F16B 5/126* (2013.01)

(58) Field of Classification Search
CPC .............. E04F 19/0463; E04F 19/0436; E04F 19/0495; F16B 5/07; F16B 5/123; F16B 5/126
USPC ........................................ 52/716.4
See application file for complete search history.

(56) References Cited

U.S. PATENT DOCUMENTS

| | | | | |
|---|---|---|---|---|
| 2,217,574 A | * | 10/1940 | Tinnerman | F16B 5/125 52/718.06 |
| 3,473,278 A | * | 10/1969 | Gossen | E04F 19/0463 52/211 |
| 3,667,177 A | * | 6/1972 | Biela | A47K 3/008 4/252.1 |
| 3,707,061 A | * | 12/1972 | Collette | E04F 19/0463 24/336 |
| 3,742,668 A | * | 7/1973 | Oliver | E04F 19/028 52/288.1 |
| 3,899,859 A | * | 8/1975 | Smith | E04F 19/0468 52/288.1 |
| 3,942,295 A | | 3/1976 | Schacht | |
| 3,995,402 A | | 12/1976 | Parenteau | |
| 4,037,900 A | | 7/1977 | Schmidger | |
| 4,067,155 A | * | 1/1978 | Ruff | E04B 1/6803 4/498 |
| 4,150,517 A | * | 4/1979 | Warner, Sr. | E04F 19/0436 52/288.1 |
| 4,165,577 A | * | 8/1979 | Shanahan | A01M 1/223 43/112 |
| 4,337,604 A | | 7/1982 | Burgers | |
| 4,472,862 A | * | 9/1984 | Bloomfield | A01G 9/1407 24/460 |
| 4,527,369 A | * | 7/1985 | Adams | E06B 1/18 52/211 |
| 4,621,471 A | * | 11/1986 | Kuhr | E04B 2/82 52/242 |
| 4,723,580 A | * | 2/1988 | Trautwein | H02G 3/26 138/163 |
| 4,845,910 A | | 7/1989 | Hanson et al. | |
| 4,856,253 A | * | 8/1989 | Jou | E04F 19/026 52/242 |
| 5,001,877 A | * | 3/1991 | Edwards | B44C 5/00 403/295 |
| 5,157,886 A | | 10/1992 | Azzar et al. | |

(Continued)

*Primary Examiner* — Beth A Stephan
(74) *Attorney, Agent, or Firm* — Wells St. John P.S.

(57) ABSTRACT

This disclosure includes a securement device for securing molding to a surface. The securement device has a base attached to a surface. A stem extends from the base and has a top portion opposite from the base. A pair of flexible curved structures extends laterally from opposite sides of the stem toward the base.

21 Claims, 19 Drawing Sheets

(56) References Cited

U.S. PATENT DOCUMENTS

| | | |
|---|---|---|
| 5,357,053 A | 10/1994 | Manaras |
| 5,359,817 A * | 11/1994 | Fulton .................. E04F 19/026 52/288.1 |
| 5,426,901 A * | 6/1995 | Indracek ............. E04F 19/0436 52/288.1 |
| 5,433,048 A * | 7/1995 | Strasser .................... E04B 9/30 52/288.1 |
| 5,592,720 A | 1/1997 | Sasakawa et al. |
| 5,598,681 A | 2/1997 | DiGianni |
| 5,651,224 A * | 7/1997 | Brabant ............. E04F 19/0436 52/288.1 |
| 5,657,598 A * | 8/1997 | Wilbs .................. A47G 27/045 403/122 |
| 5,732,747 A * | 3/1998 | Holliday ............. H02G 3/0425 138/157 |
| 5,901,516 A | 5/1999 | Watson |
| 5,938,846 A | 8/1999 | Swan |
| 5,943,829 A | 8/1999 | Wilson |
| 6,189,276 B1 | 2/2001 | Pinto et al. |
| 6,191,363 B1 | 2/2001 | Samuels |
| 6,202,380 B1 | 3/2001 | Trutwin et al. |
| 6,216,406 B1 | 4/2001 | Hauser |
| 6,287,046 B1 * | 9/2001 | Neuhofer, Jr. ...... E04F 19/0463 16/16 |
| 6,354,057 B1 | 3/2002 | Ploplis |
| 6,412,799 B1 | 7/2002 | Schrempf |
| 6,419,207 B1 | 7/2002 | Barry et al. |
| 6,470,647 B2 | 10/2002 | Hsueh |
| 6,588,165 B1 * | 7/2003 | Wright .................. E04F 19/06 52/459 |
| 6,604,331 B1 | 8/2003 | Pallas et al. |
| 7,040,065 B2 * | 5/2006 | Pickup .................... E04F 19/04 52/287.1 |
| 7,392,627 B2 * | 7/2008 | Sondermann ........ E04F 19/062 52/395 |
| 7,404,272 B2 | 7/2008 | Piche |
| 7,434,329 B2 | 10/2008 | Walda |
| 7,516,584 B2 | 4/2009 | Valentine |
| 7,574,836 B2 * | 8/2009 | Wesolowska ........... E04F 19/04 439/216 |
| 7,594,368 B2 * | 9/2009 | Kurz .................... E04F 19/0468 24/289 |
| 7,632,107 B2 | 12/2009 | Mizumura |
| 7,870,697 B2 * | 1/2011 | Galas .................. E04F 19/0463 52/211 |
| 7,895,802 B2 * | 3/2011 | Kurz ................. E04F 15/02005 52/395 |
| 8,051,613 B2 | 11/2011 | Lu et al. |
| 8,084,379 B2 | 12/2011 | Hogan et al. |
| 8,186,118 B2 * | 5/2012 | Neuhofer ............. E04F 19/061 52/312 |
| 8,500,460 B2 | 8/2013 | Huang et al. |
| 8,833,024 B1 | 9/2014 | Adams |
| 8,877,113 B2 | 11/2014 | Ishizu et al. |
| 8,950,134 B2 | 2/2015 | Vaes et al. |
| 8,955,928 B2 | 2/2015 | Cheng |
| 9,021,766 B1 | 5/2015 | Hayes |
| 9,151,061 B2 * | 10/2015 | Schaefer ............... E04F 13/148 |
| 9,157,240 B2 | 10/2015 | Halischuk |
| 9,394,703 B2 * | 7/2016 | Schaefer ............... E04F 13/148 |
| 2001/0032432 A1 | 10/2001 | Paxton et al. |
| 2002/0127368 A1 * | 9/2002 | Richardson ............... B44C 1/28 428/99 |
| 2004/0083664 A1 | 5/2004 | Allen |
| 2008/0202049 A1 * | 8/2008 | Galas .................. E04F 19/0463 52/288.1 |
| 2009/0071089 A1 * | 3/2009 | Neuhofer, Jr. ........ E04F 19/061 52/469 |
| 2010/0018145 A1 * | 1/2010 | Ellis .................... E04F 19/0436 52/312 |
| 2011/0179733 A1 * | 7/2011 | Picken .................... E04F 19/02 52/242 |
| 2011/0302865 A1 * | 12/2011 | Kliegle ............... E04F 13/0835 52/483.1 |
| 2012/0210667 A1 | 8/2012 | Daniocek et al. |
| 2015/0107174 A1 | 4/2015 | Silk et al. |

* cited by examiner

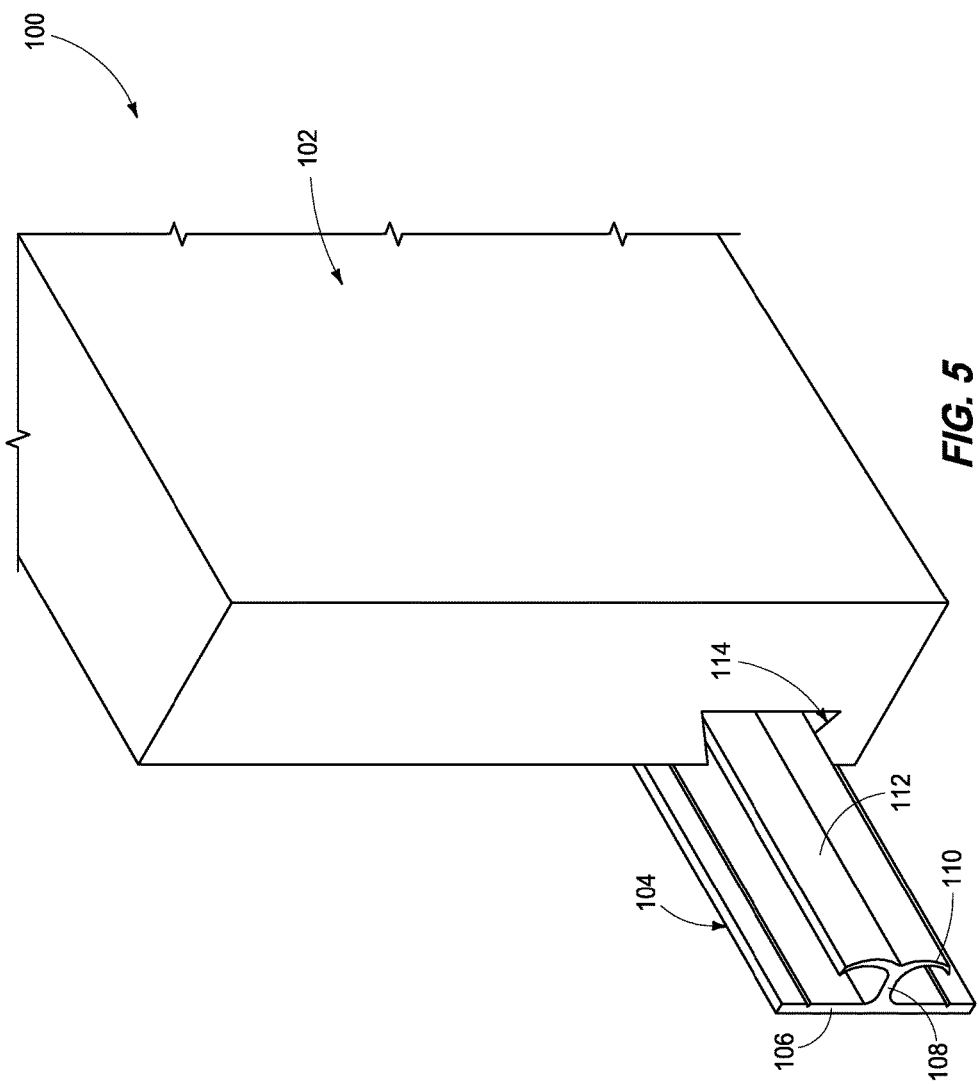

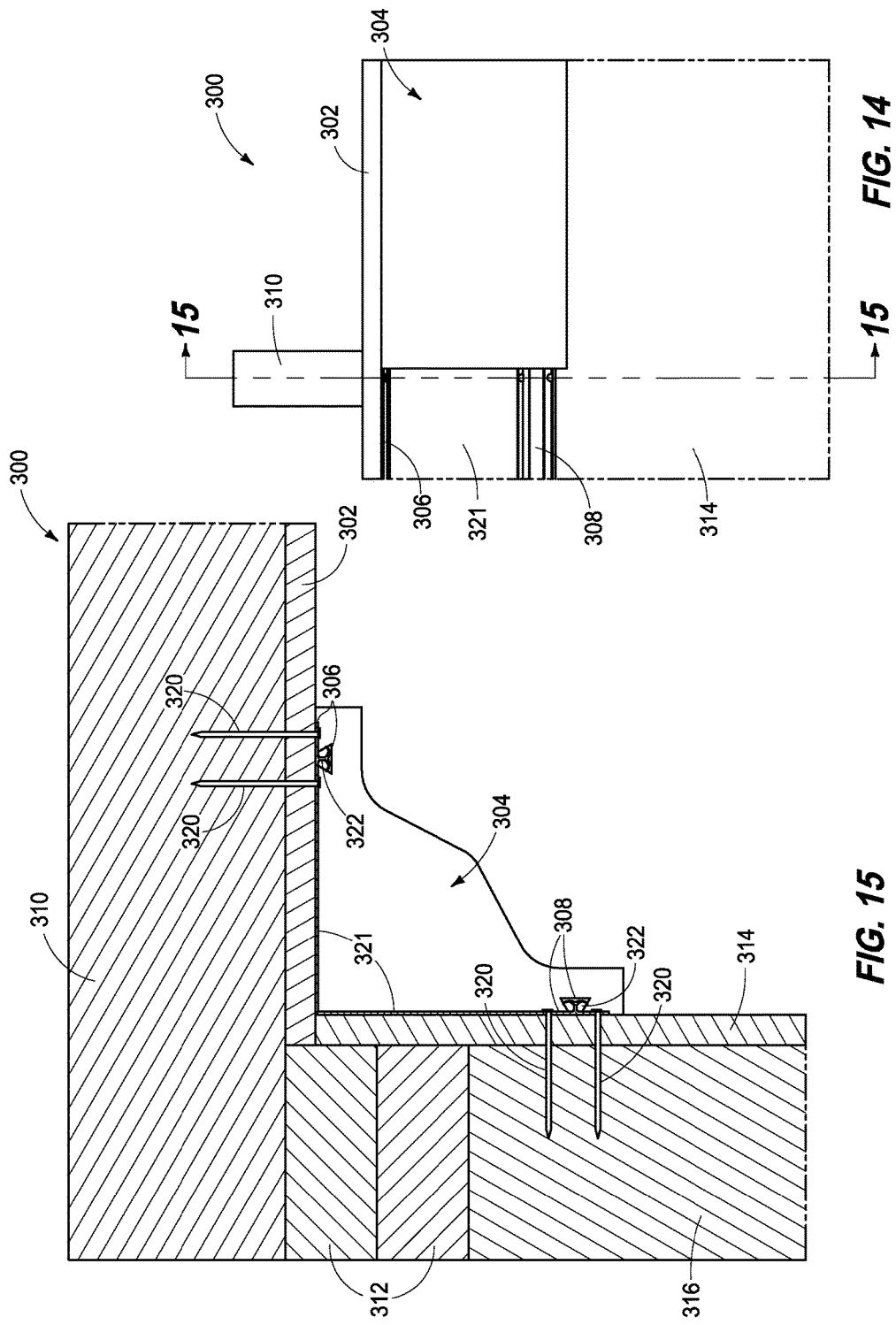

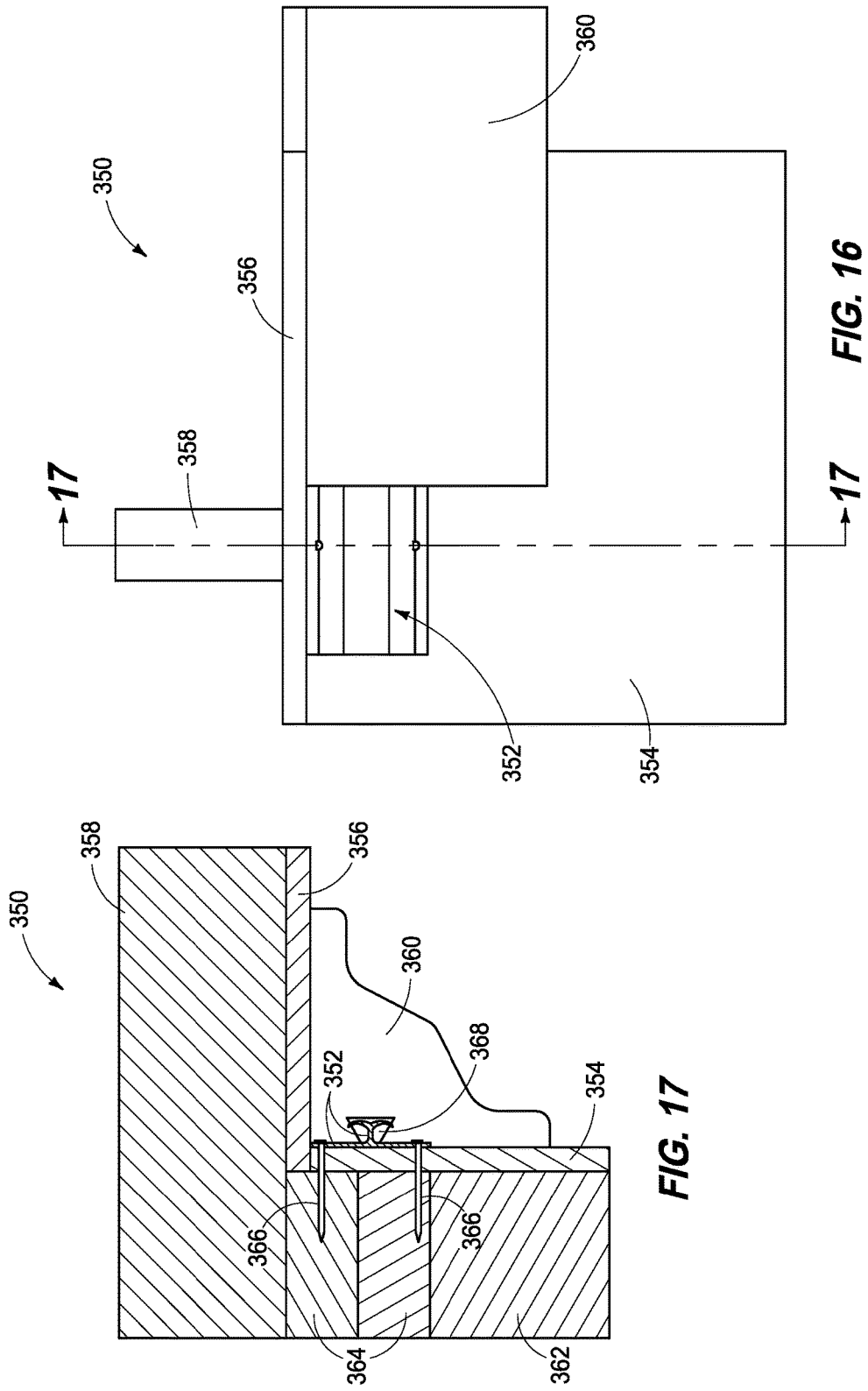

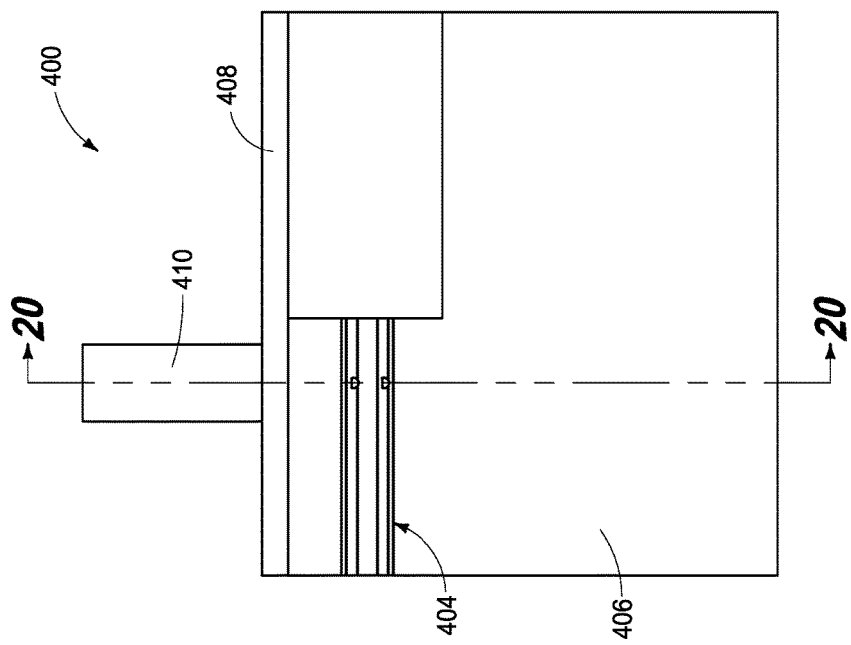
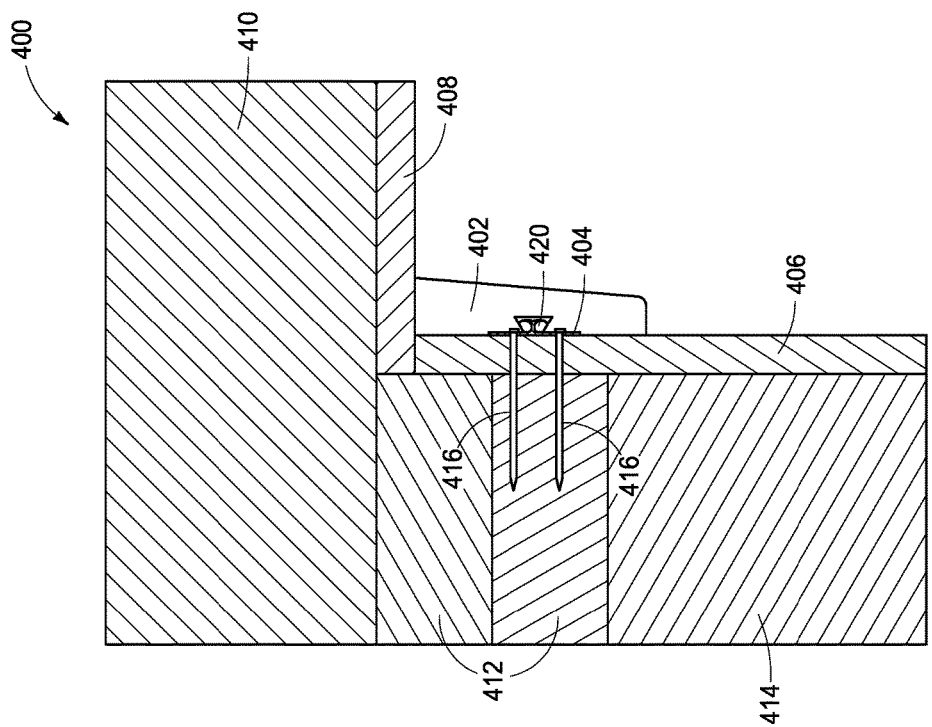

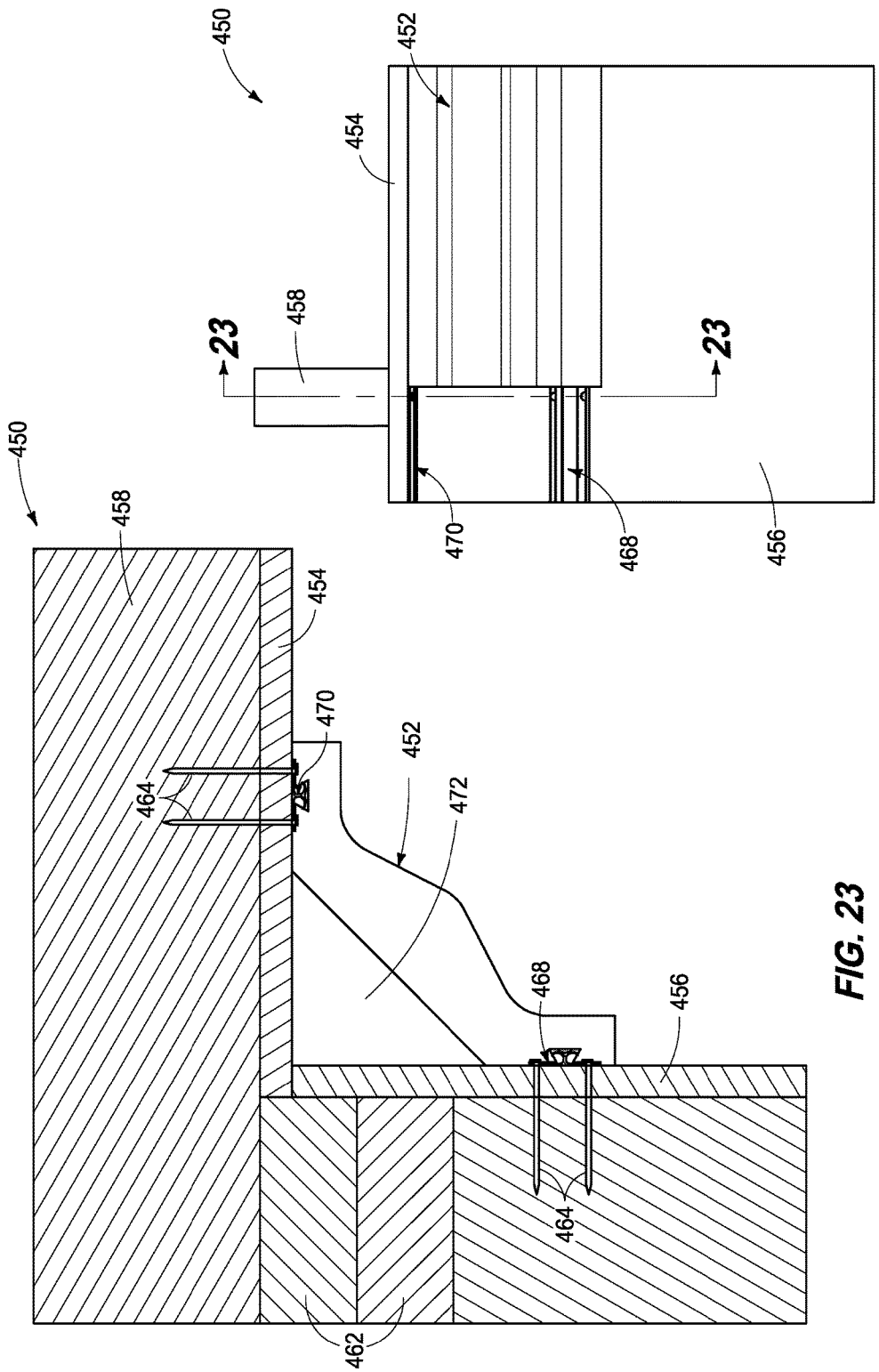

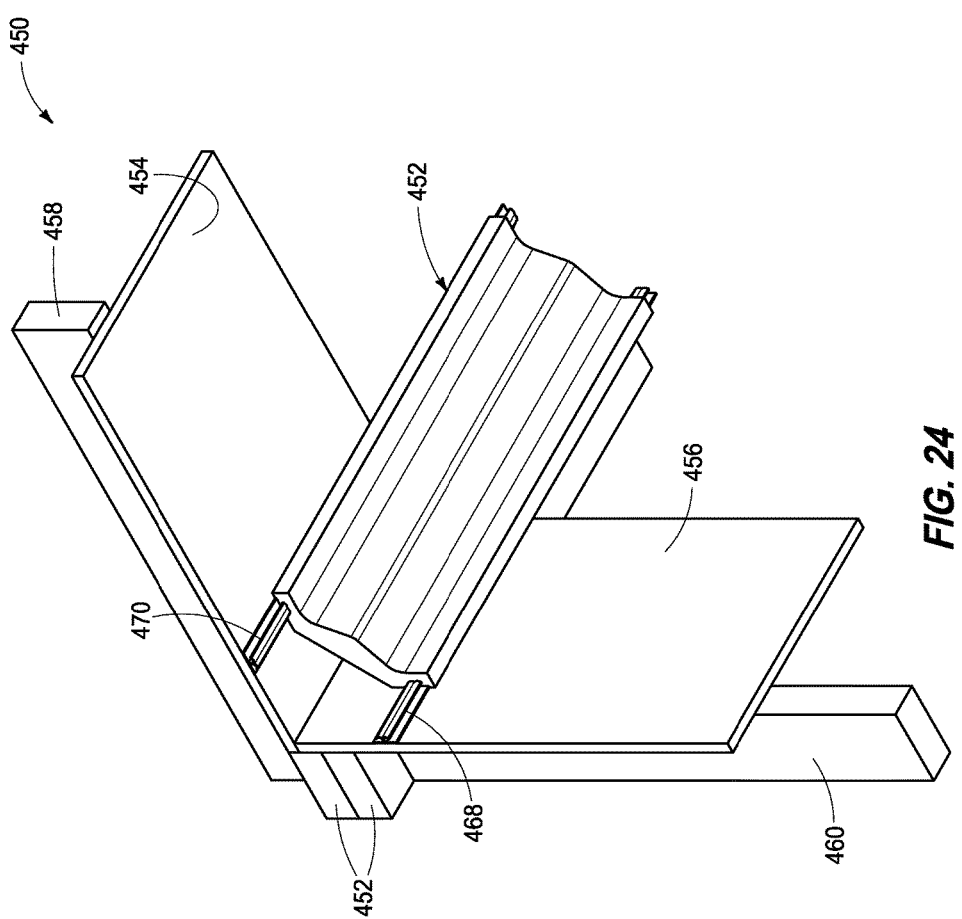

SECUREMENT DEVICES FOR SECURING MOLDING TO A SURFACE, AND METHODS OF SECURING MOLDING TO A SURFACE

CROSS REFERENCE TO RELATED APPLICATION

This application does not claim priority from any other application.

TECHNICAL FIELD

The subject matter of this application relates to securement devices for securing molding to a surface and methods of securing molding to a surface.

BACKGROUND OF THE DISCLOSURE

Moldings and trims are routinely provided on surfaces, particularly on surfaces in the interior of buildings. The moldings and trims are used as decorative devices and provided on the surfaces as permanent fixtures. However, since differing aesthetic preferences of individuals are as varied as the number of individual personalities, there is a need to design moldings and trims that are replaceable or interchangeable to satisfy the desire of an individual's preference.

While the subject matter of this application was motivated in addressing securement devices for securing molding to a surface and methods of securing molding to a surface, it is in no way so limited. The disclosure is only limited by the accompanying claims as literally worded, without interpretative or other limiting reference to the specification, and in accordance with the doctrine of equivalents.

Other aspects and implementations are contemplated.

BRIEF DESCRIPTION OF THE DRAWINGS

Exemplary embodiments of the various disclosures are described below with reference to the following accompanying drawings. The drawings may be considered to represent scale.

FIG. 5 is a simplified perspective view of an exemplary method of securing molding to a surface according to an embodiment of the invention.

FIG. 14 is a side view of FIG. 13.

FIG. 15 is a sectional view taken along sectional lines 15-15 in FIG. 14.

FIG. 16 is a simplified side view of an exemplary method of securing molding to a surface according to an embodiment of the invention.

FIG. 17 is a sectional view taken along sectional lines 17-17 in FIG. 16.

FIG. 19 is a simplified side view of an exemplary method of securing molding to a surface according to an embodiment of the invention.

FIG. 20 is a sectional view taken along sectional lines 20-20 in FIG. 19.

FIG. 22 is a simplified side view of an exemplary method of securing molding to a surface according to an embodiment of the invention.

FIG. 23 is a sectional view taken along sectional lines 23-23 in FIG. 22.

FIG. 24 is a simplified perspective view of FIG. 22.

DETAILED DESCRIPTION OF THE EMBODIMENTS

This disclosure is submitted in furtherance of the constitutional purposes of the U.S. Patent Laws "to promote the progress of science and useful arts" (Article 1, Section 8).

The terms "a", "an", and "the" as used in the claims herein are used in conformance with long-standing claim drafting practice and not in a limiting way. Unless specifically set forth herein, the terms "a", "an", and "the" are not limited to one of such elements, but instead mean "at least one".

Figure 1:
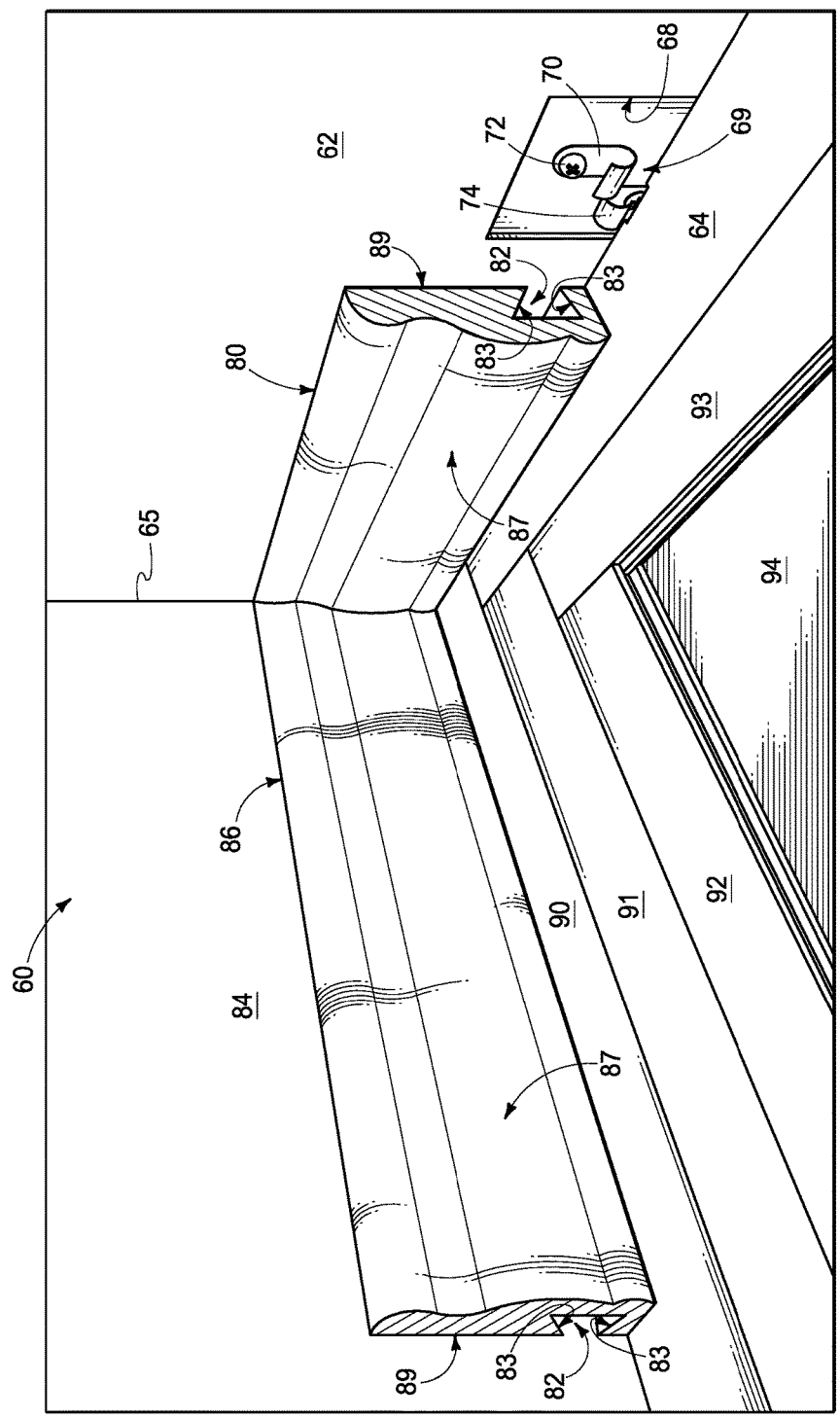
FIG. 1 is a perspective view of an exemplary method of securing molding to a surface according to an embodiment of the invention.
Figure 2:
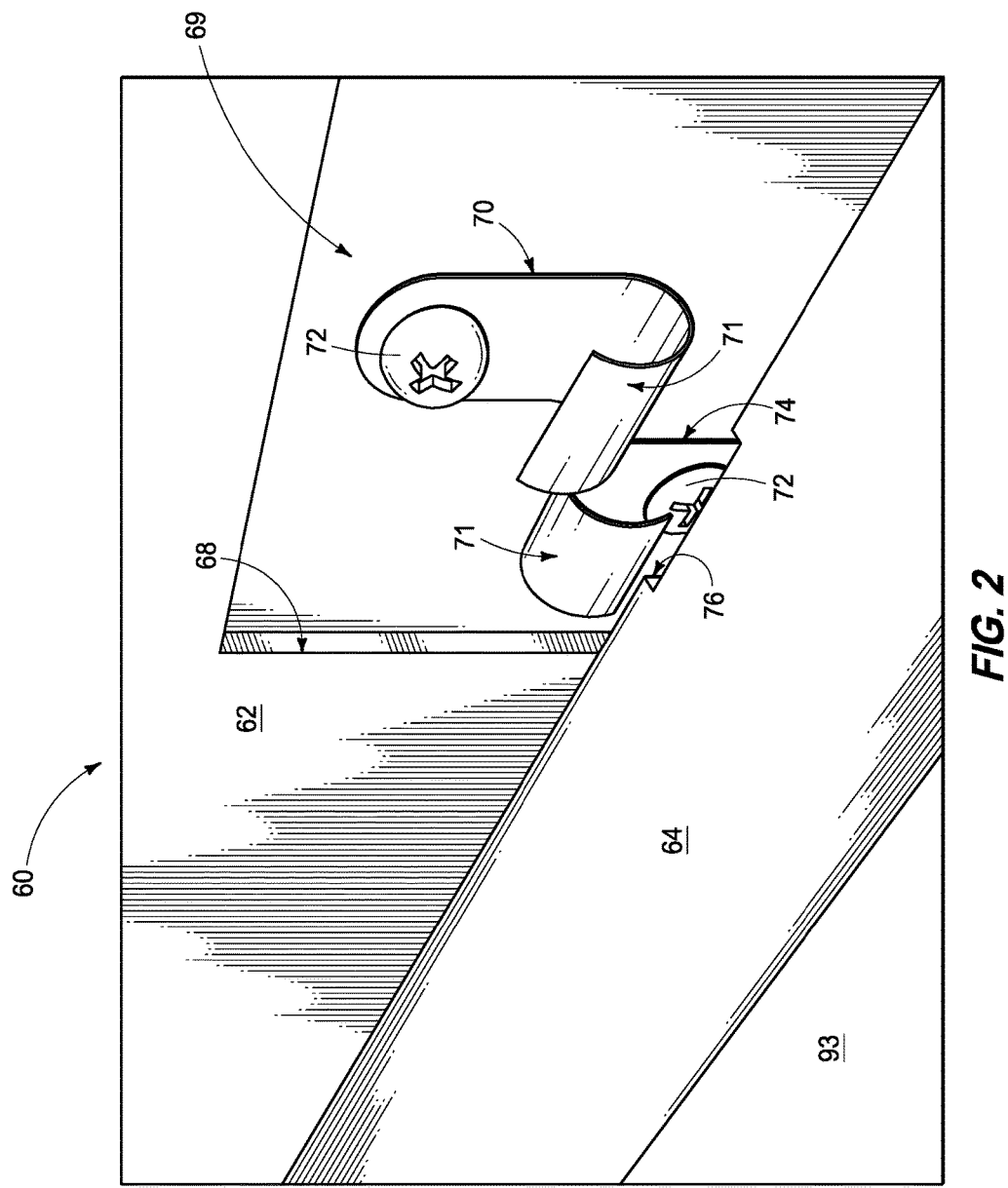
FIG. 2 is a close-up view of the securement device of FIG. 1.

Referring to FIGS. 1 and 2, exemplary moldings and/or trims 80, 86 are shown extending along respective surfaces 62, 84, such as walls, that intersect at a corner 65. Outer (or front) faces 87 of the trims 80, 86 have decorative configurations that include curved surfaces. It should be understood that other moldings and trims can have exemplary front faces 87 with differing shape configurations of those presented in this document for differing decorative effect. Opposite the front faces 87, trims 80, 86 include inner (or rear) surfaces 89 configured as a plane to extend along the planar configurations of walls 62, 84. The trims 80, 86 further include an opening 82 established through the rear surfaces 89 oriented toward the front faces 87.

In one exemplary configuration, openings 82 are shaped as a trapezoid (dovetail opening; dovetail joint opening) in a cross-sectional view of the moldings (trims) 80, 86. It should be understood that throughout this document and applicable to all embodiments described herein, the openings 82 of any molding can be shaped differently. For example, a first portion of opening 82 at the rear surface 89 of molding will have the smallest dimension of the opening 82 (in cross section) with cross section dimensions of the opening 82 increasing as the opening 82 extends farther into the molding from the rear surface 89. For example, opening 82 could be a "T" shape in the cross-sectional view (with the upper part of the "T" spaced from the rear surface of trims 80, 86). Another example, opening 82 could have "steps" (or a stairs) configuration in the cross section sides of the opening 82 wherein the steps increase the cross section dimension of opening 82 as you progress into the molding from the rear surface 89.

An exemplary embodiment of openings 82 extend linearly along any length of the trims 80, 86. That is, openings 82 can extend the entire length of the trims 80, 86, Alternatively, the openings 82 can extend only a partial length of the trims 80, 86. Still further, any one trim 80, 86 can have different portions of opening 82 having different lengths. For example, one portion of opening 82 in trim 80 can have a length of 3 inches and another portion of opening 82 in trim 80 can have a length of 2 inches and so on. Any one trim 80, 86 can have as many discrete portions of opening 82 as desired, and each respective portion of opening 82 can have any desired length in the respective trims 80, 86. It should be understood that any of the various length and shape configurations for opening 82 can exist in any molding and trim discussed throughout this document.

Still referring to FIGS. 1 and 2, particularly FIG. 2, a securement device 69 (attachment device, affixing device, snap-on device or clip-on device) is illustrated and configured to secure the trims 80, 86 against respective walls 62, 84. For this exemplary embodiment, each securement device 69 is configured with a pair of separate and discrete retainer structures 70, 74. Alternatively, the entire securement device 69 structure can be a single retainer structure, or more than two retainer structures. In this embodiment, each retainer structure 70, 74 has the same structural configuration that includes a strip of flexible and/or resilient and/or elastic with one end secured to the walls 62, 84 by screws or bolts 72. Opposite the secured ends, each retainer structure 70, 74 has curved or rolled (coil, spiral, curl or bow-shaped) ends 71 directed toward the bolts 72. Accordingly, the entire structure of the securement device 69 can be one or more rectangular strips of material that has one end rolled into a curl. An end opposite the curl or coil will be the screw or bolt.

It should be understood that in one embodiment, an entirety of the structure for the securement device 69 has no components and is a single sheet of material configured with the curved portion. Screw 72 can be thought of as a structure that is not included as a component of the securement device 69, and alternatively, can be thought of as a component of the securement device 69.

In this exemplary embodiment of securement device 69, the retainer structures 70, 74 are not in vertical alignment, and therefore, laterally spaced. Accordingly, since the retainer structures 70, 74 are to be provided in an opening 82, the length of opening 82 will be sufficient to accommodate the lateral spacing distance between respective retainer structures 70, 74.

Alternatively, the retainer structures 70, 74 can be vertically aligned, and therefore, the length of opening 82 to accommodate receipt of retainer structures 70, 74 will not need to be as large as for the laterally spaced retainer structures 70, 74. The retainer structure 70 has the curved end 71 most proximate the floor structure 64 and retainer structure 74 has the bolt 72 end most proximate the floor structure 64. The respective curved ends 71 of the retainer structures 70, 74 will contact and bias the respective angled sides 83 of the dovetail configuration of openings 82. This biasing translates to biasing the molding and trim 80, 86 against respective surfaces, that is, walls 62, 84.

Still referring to FIGS. 1 and 2, the vertical orientation of the retainer structures 70, 74 could be reversed. That is, retainer structure 70 can have the bolt 72 end most proximate the floor structure 64 while retainer structure 74 has the curved end 71 most proximate the floor structure 64. In this reversed arrangement, the curved ends 71 of respective retainer structures 70, 74 will contact, and be biased against, different respective angled sides 83 of openings 82 than the arrangement illustrated and described with respect to FIG. 1.

Still referring to FIGS. 1 and 2, the discrete retainer structures 70, 74 of securement device 69 are secured in a recess 68 (only one shown) in walls 62, 84. Alternatively, the securements device 69 are secured directly to walls 62, 84 without being in a recess. Structures 90, 91, 92, 93, 94 and 64 represent various combinations of floor structures and sub-floor structures. Alternatively, structures 90, 91, 92, 93, 94 and 64 represent various combinations of ceiling structures and sub-ceiling structures. Still further, alternatively, structures 90, 91, 92, 93, 94 and 64 represent various combinations of borders for doors and/or window openings. Floor structure 64 has a recess 76 to accommodate a portion of retainer structure 74 (and bolt 72) of the securement device 69. In other embodiments, the recess 76 is not needed.

Still referring to FIGS. 1 and 2, exemplary methods of securing trims 80, 86 to the respective walls 62, 84 are disclosed. Securement devices 69 are secured (attached) to the respective walls 62, 84 by a fastener including bolts, rivets, screws, cement, glue and other adhesives. Trims 80, 86 with openings 82 are aligned over securement devices 69. Pressure is applied to the trims 80, 86 in the direction toward walls 62, 84 forcing the securement devices 69 into the openings 82 (alternatively stated, forcing openings 83 over securement devices 69).

While pressure is being applied, portions of the rear surfaces 89 of trims 80, 86, proximate openings 82, come into contact with retainer structures 70, 74, particularly the flexible (and/or resilient and/or elastic) curved ends 71. The pressure on trims 80, 86 force the flexible curved ends 71 to bow (arc or curve) inwardly directed toward the walls 62, 84 and bolts 72. That is, curved ends 71 constrict (contract, shrink or compress) inwardly to further curve or coil onto themselves in a smaller radius. The curved ends 71 are constricted/bowed until they move past the rear surfaces 89 of trims 80, 86 and a greater distance into openings 82. In openings 82, the curved ends 71, may or may not, expand or flex outwardly (if sufficient room exists in openings 82 for expanding) from the constricted or bowed configuration and ultimately rest, in a biased relationship, against the angled sides 83 of openings 82. During the biasing relationship, the trims 80, 86 are held against respective walls 62, 84 by the securement devices 69.

Still referring to FIGS. 1 and 2, exemplary methods of removing trims 80, 86 from the respective walls 62, 84 are disclosed. The trims 80, 86 are grasped or seized (or held, secured, gripped) in a hand (or tool) and pulled with a force in the direction away from the walls 62, 84. When the pulling force is greater than the force of the biasing action applied by the retainer structures 70, 74 of securement devices 69 in openings 82, the trims 80, 86 are released from the securement devices 69 and walls 62, 84. The securement devices 69 are now available to receive differently configured trims, as desired, to be secured upon the securement devices 69 and to walls 62, 84.

Figure 3:
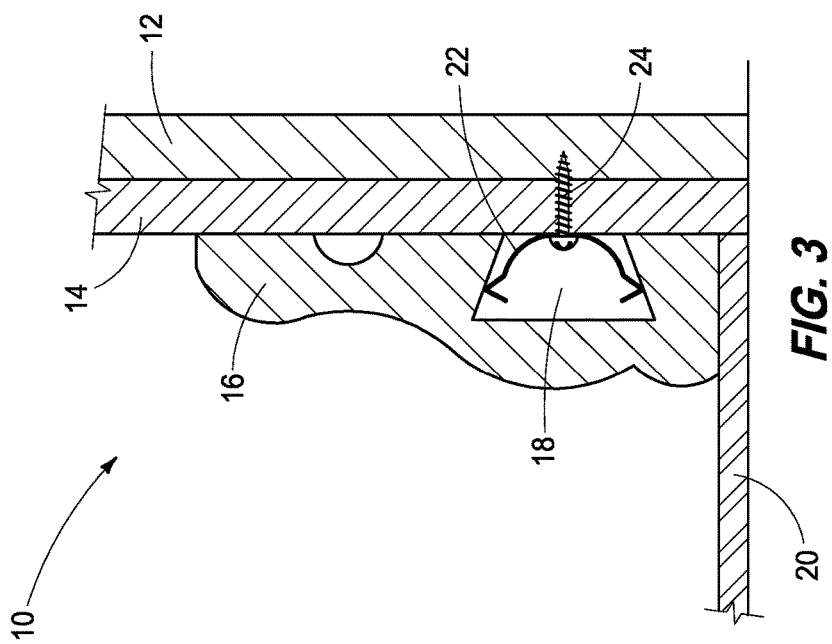
FIG. 3 is a side sectional view of an exemplary method of securing molding to a surface according to an embodiment of the invention.

Referring to FIG. 3, another embodiment 10 of the invention is disclosed wherein the securement device 22 is configured as a single, integral structure (not two or more discrete structures as disclosed previously regarding securement device 69). Additionally, the shape configuration of the securement device 22 differs from the previously described securement device 69. Securement device 22 has a primary cup shape portion and two V-shape portions provided at the terminal ends of the cup shape portion. The V-shape portions have points directed outward in opposite directions. The cup shape portion is flexible (and/or resilient and/or elastic) so that the V-shape portions can be biased inwardly toward each other. The cup shape portion of securement device 22 naturally biases the V-shape portions away from other.

Still referring to FIG. 3, exemplary structures and sub structures 12, 14 and 20 are illustrated and can be provided as one or more of walls, floors and/or ceilings. Trim 16 has an opening 18 to receive securement device 22 wherein trim 16 is secured against the structures and sub structures 12, 14 and 20. Securement device 22 is secured to one or more of structures 12, 14 by a screw 24 extending through a bottom section of the cup shape portion. With the V-shape portions of securement device 22 biased against the sides of opening 18, trim 16 is secured against the structures 12, 14 and 20. That is, the cup shape portion of the securement device 22 biases the V-shape portions to contact and apply pressure to the sides of opening 18. It should be understood that an entirety of the structure for the securement device 22 has no components and is a single sheet of material configured with the primary cup shape portion and the two V-shape portions. Screw 24 can be thought of as a structure that is not included as a component of the securement device 22, and alternatively, can be thought of as a component of the securement device 22.

Still referring to FIG. 3, an exemplary method for securing trim 16 to structures and sub structures 12, 14 and 20 is the same as previously described for embodiment 60 of FIGS. 1 and 2. Still further, an exemplary method for removing trim 16 from structures and sub structures 12, 14 and 20 is the same as previously described for embodiment 60 of FIGS. 1 and 2.

Figure 4:
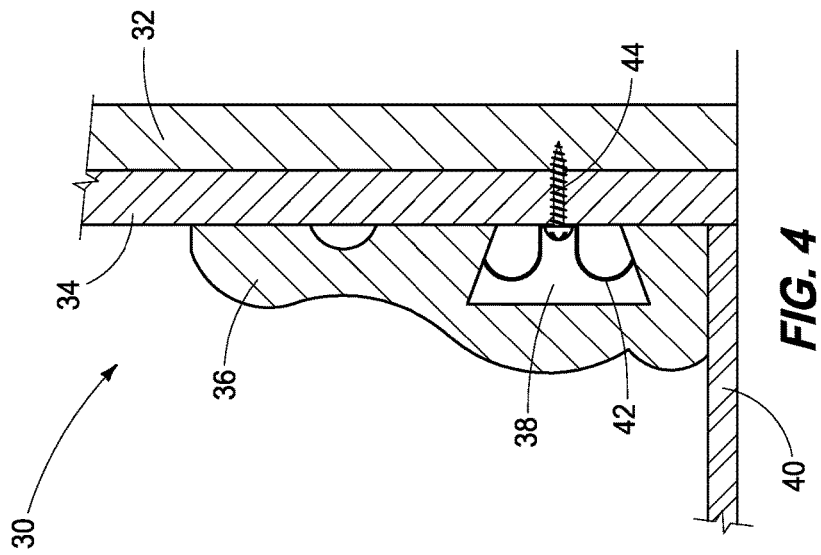
FIG. 4 is a side sectional view of an exemplary method of securing molding to a surface according to an embodiment of the invention.

Referring to FIG. 4, another embodiment 30 of the invention is disclosed wherein the securement device 42 is configured as a single, integral structure. Structures and sub structures 32, 34 and 40 are provided for one or more of walls, floors and/or ceilings. An exemplary trim 36 has an opening 38 to receive securement device 42 and thereby secure trim 36 against the structures and sub structures 32, 34 and 40. The shape configuration of the securement device 42 includes a base portion to receive screw 44 (screw 44 attaches the securement device 42 to one or more of structures and sub structures 32, 34). Extending from opposite sides of the base portion, securement device 42 has two curved portions with terminal ends directed downward. With securement device 42 in opening 38 of trim 36, the terminal ends of the curved portions are biased against, and apply pressure to, the sides of the opening 38 thereby securing trim 36 against the structures and sub structures 32, 34 and 40.

It should be understood that an entirety of the structure for the securement device 42 has no components and is a single sheet of material configured with the base portion and the two curved portions. Screw 44 can be thought of as a structure that is not included as a component of the securement device 42, and alternatively, can be thought of as a component of the securement device 42.

Still referring to FIG. 4, an exemplary method for securing trim 36 to structures and sub structures 32, 34 and 40 is the same as previously described for embodiment 60 of FIGS. 1 and 2. Still further, an exemplary method for removing trim 36 from structures and sub structures 32, 34 and 40 is the same as previously described for embodiment 60 of FIGS. 1 and 2.

Referring to FIG. 5, another embodiment 100 of the invention is disclosed wherein the entire securement device 104 is configured as a single, integral structure (no individual or discrete components). However, alternatively, securement device 104 can be configured as separate and discrete components discussed subsequently. Unlike the previously described securement devices, securement device 104 is an elongated structure directed in the direction of the elongated dimension of molding 102. It should be understood that trim 102 is illustrated as a simple block configuration with the understanding that it can have any shape configuration depending on an individual's preferences. Trim 102 has an opening 114 to receive at least a portion of securement device 104 thereby securing trim 102 to other structures. It should be understood that structures and sub structures used for one or more of walls, floors, ceilings, windows and doors are not shown in this embodiment for simplicity.

Still referring to FIG. 5, securement device 104 includes a planar base 106 and a stem 108 that extends from one side of the base 106. The base 106 has a width and the stem 108 extends from a central location of the width dimension. The stem 108 terminates outward from the base 106 and has a pair of arcs or curved structures 110, 112 that extend laterally, and generally perpendicularly, from opposite sides of the terminal end of stem 108. For simplicity, the curved structures will be referred to as wings 110, 112 and can be thought of as flexible (and/or resilient and/or elastic) hooks, flexible (and/or resilient and/or elastic) retaining/holding/suspending devices/structures, flexible (and/or resilient and/or elastic) curved/angular devices/structures. The wings 110, 112 have a cross section dimension that is greatest proximate the stem and smallest at the terminal end of the wings 110, 112. The terminal end of the wings 110, 112 can be thought of as points. The wings 110, 112 are directed outward from the stem 108 and terminate pointing downward toward the base 106. A side of base 106 opposite the stem 108 will be secured against one or more of the structures and/or sub structures for walls, floors, ceiling, windows and doors not shown. Securement of the base 106 can be by glue, cement, bolts, screws, nails, rivets, fastening tape such as the product which is brand named: Velcro™' etc. (the same for all securement devices disclosed in this document).

It should be understood that any securement device disclosed in this document can be attached to any surface with any one, or any combination of, the following: glue, cement, bolts, screws, nails, rivets, fastening tape such as the product which is brand named: Velcro™, etc. As one example, a first fastening tape with either nylon hooks or nylon pile can be attached or secured to a surface (which is to receive the securement device) wherein the rear side or surface of a base of a securement device has a second fastening tape attached and with corresponding nylon pile or nylon hooks (one fastening tape will have the hooks while the other will have the pile). Then the fastening tape of the base is aligned with the fastening tape of the surface and pressed together.

Still referring to FIG. 5, base 106, stem 108 and wings 110, 112 can all be constructed from the same material.

Alternatively, one or more of base 106, stem 108 and wings 110, 112 can be constructed of a different material. For example, base 106 can be constructed of a material having a given sturdiness and rigidity. The stem 108 can be constructed of a material having a sturdiness and rigidity value that is less than the values of the base 106. Stated another way, the stem 108 will be more flexible (and/or resilient and/or elastic) than the base 106. Still further, the wings 110, 112 can be constructed of a material having a sturdiness and a rigidity value that is less than the values of the stem 108. Stated another way, the wings 110, 112 will be more flexible (and/or resilient and/or elastic) than the stem 108.

As discussed previously, embodiment 100 of the securement device 104 is disclosed as a single integral structure. However, alternatively, it should be understood that any embodiment of any securement device disclosed throughout this document can be divided into any combination of discrete and separate structures that are secured to each other. For example, one or more of base 106, stem 108 and wings 110, 112 of embodiment 100 can be separate and discrete structures such that the separate structures are connected to an adjacent structure. The attachment between the discrete structures can be a permanent attachment, and if so, the permanent attachment can be provided by cement, glue, permanent snap-on configuration, etc.

Alternatively, any securement device disclosed throughout this document can have any combination of individual and discrete structures that are not permanently attached. That is, the individual and discrete structures are configured to be selectively removable (and replaceable) from an adjacent structure, and alternatively, selectively attachable to an adjacent structure. For example, referring to the securement device 104 of embodiment 100, one or both of the wings 110, 112 can be separate and discrete structures relative to the stem 108. Accordingly, wings 110, 112 will be selectively removable from the stem 108 and selectively attachable to the stem 108. Additionally, wings 110, 112 may, or may not, be a more flexible material than the stem 108. Similarly, stem 108 can be a separate and discrete structure relative to one, or both, of base 106 and wings 110, 112. Accordingly, stem 108 will be selectively removable from one, or both, of base 106 and wings 110, 112. Moreover, stem 108 will be selectively attachable to one, or both, of base 106 and wings 110, 112. Still further, stem 108 may, or may not, be a more flexible material than one, or both, of base 106 and wings 110, 112.

Still referring to the configuration of securement devices having attachable, replaceable, and removable structures, the capability of attachable/removable structures can be provided with snap fasteners designed into the structures (described subsequently with respect to FIG. 27). Snap fasteners are known and understood by ones skilled in the art as demonstrated by the description in *Wikipedia* found at: https://en.wikipedia.org/wiki/Snap_fastener. Exemplary snap fasteners are a simple, economical and rapid way of joining two separate components. An example of a snap fasteners, as a non-limiting example only, is a press stud connecting which are based on the principle that a protruding part of one component, termed the male component, is pressed into the opening part of the other component, termed the female component.

There are various designs of snap fasteners. A male component can be configured as a hook, stud or bead which is deflected briefly during the joining (mating) operation and catches in a depression (undercut) in the female component. Snap fasteners may be separable (removably secured) or inseparable (permanent) depending on the shape of the undercut. The force required to separate the components varies greatly according to the design.

Referring to the previously described example (but not shown in the figures), consider wings 110, 112 that are separate and discrete structures relative to the stem 108. An exemplary snap fastener is the press stud design. The terminal end of stem 108 can have a pair of male components, that is studs, on opposite sides of the stem 108. Each wing 110, 112 will have a female component, that is openings, to receive the studs. Each opening will be at the end of the thicker dimension of the wings 110, 112 (that is, the openings with be in the end opposite from the pointed end of wings 110, 112). Each wing 110, 112 is mated to the stem 108 by pressing each wing 110, 112 over the studs of the stem 108. That is, each wing 110, 112 is snapped-in-place on the studs of the stem 108 thereby locking or snapping the wings 110, 112 onto the stem 108. Accordingly, the wings 110, 112, collectively, are mated with the stem 108 and can be selectively assembled and unassembled in this manner. It should be understood that the mating components of the press stud can be reversed wherein each end of each wing 110, 112 has a stud and the stem 108 has a pair of female components, that is, openings to receive the studs.

Several advantages for having the securement devices described in this document as being comprised of separate components is explained. For example, having the capability to remove the wings from the stem as previously described provides the capability of replacing the wings which have different characteristics. For example, a replacement wing structure can be more flexible (and/or resilient and/or elastic) than a replaced wing structure to satisfy the capability to force the wing structure into a smaller opening in the trim structure. Additionally, a replacement wing structure can be more rigid than a replaced wing structure to satisfy the capability to support a heavier trim structure. Moreover, a replacement wing structure can have a different shape configuration, such as being smaller, or larger, than a replaced wing structure to satisfy the capability to support a trim structure with a smaller, or larger, opening in a trim structure. It should be understood that all components of an exemplary securement devices can be separate components that can be selectively detached from, and selectively attached to, other structures and having the same advantages discussed. For example, a stem can be replaced or exchanged to be more sturdy or rigid to support heavier trim structures.

Figure 6:
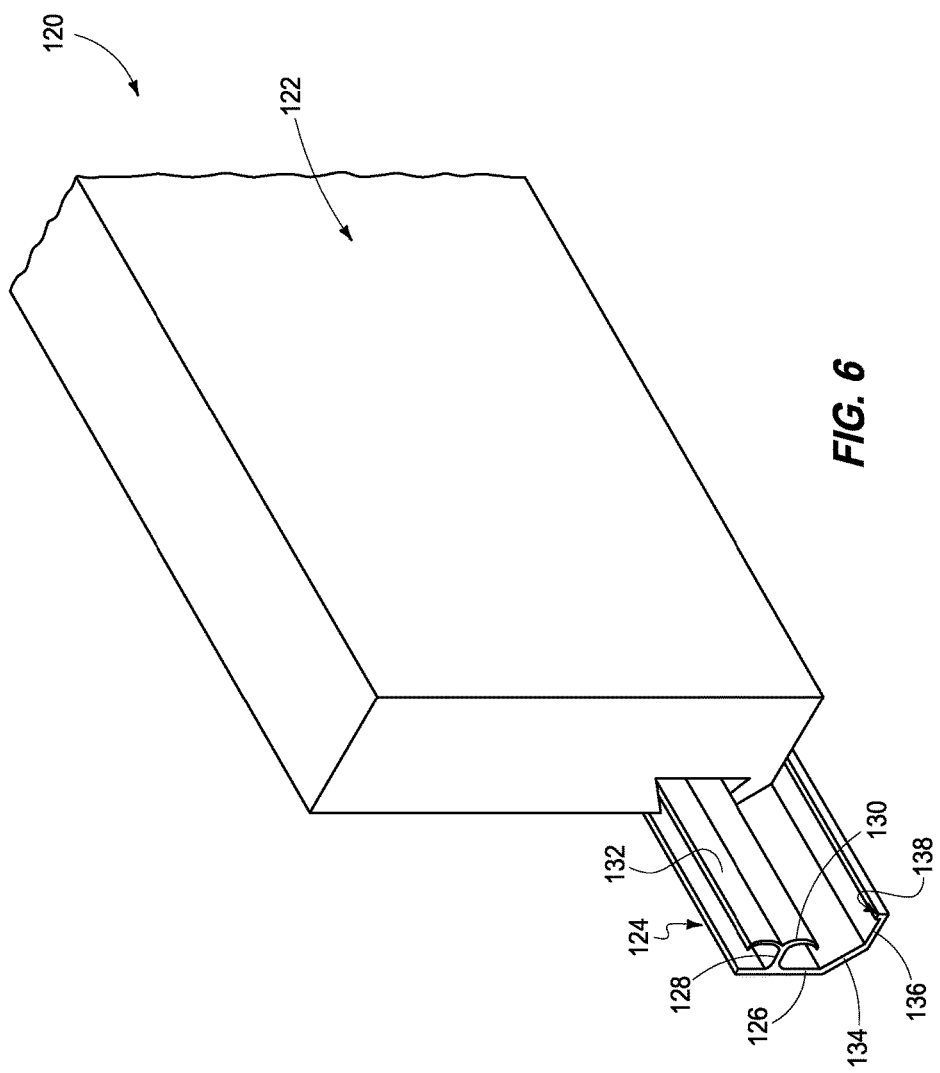
FIG. 6 is a simplified perspective view of an exemplary method of securing molding to a surface according to an embodiment of the invention.

Referring to FIG. 6, another embodiment 120 of the invention is disclosed wherein the securement device 124 is configured as a single, integral structure (no components). However, alternatively, securement device 124 can be configured as separate components as stated previously. Trim 122 has an opening (not referenced) to receive at least a portion of securement device 124 for attachment to other structures and is illustrated as a block for simplicity. Moreover, structures and sub structures for walls, floors, ceiling, windows and doors on which trim 122 will be attached are not shown for simplicity.

Still referring to FIG. 6, one embodiment of securement device 124 is designed with a first portion that has the same configuration as the securement device 104 (of embodiment 100 of FIG. 5) and includes an additional second portion extending from the first portion. The first portion of securement device 124 includes a base 126, a stem 128 and a pair of wings 130, 132 all configured and arranged the same as the securement device 104 (of embodiment 100 of FIG. 5). The second portion of the securement device 124 includes an angled section 134 that extends from an edge of the base 126 at an angle. The second portion further includes a support section 136 that extends from an edge of the angled section 134 opposite from the first portion. One, or both, of the base 126 (of the first portion) and the support section 136 (of the second portion) can be attached to structures and/or sub structures for walls, floors, ceiling, windows and doors. Attachment of the base 126 and the support section 136 can be by glue, cement, bolts, screws, nails, rivets, fastening tape such as the product which is brand named: Velcro™, etc. The support section 136 has an outer edge that includes a ridge 138 extending upwardly from along the outer edge. The support section 136 alone, and/or in combination with ridge 138, will space the trim 122 elevationally from a surface beneath the support section 136. That is, support section 136 alone, and/or in combination with ridge 138, separates the molding (trim) from a surface such as a floor allowing thermal expansion and contraction of the flooring, for example, hard flooring.

Figure 7:
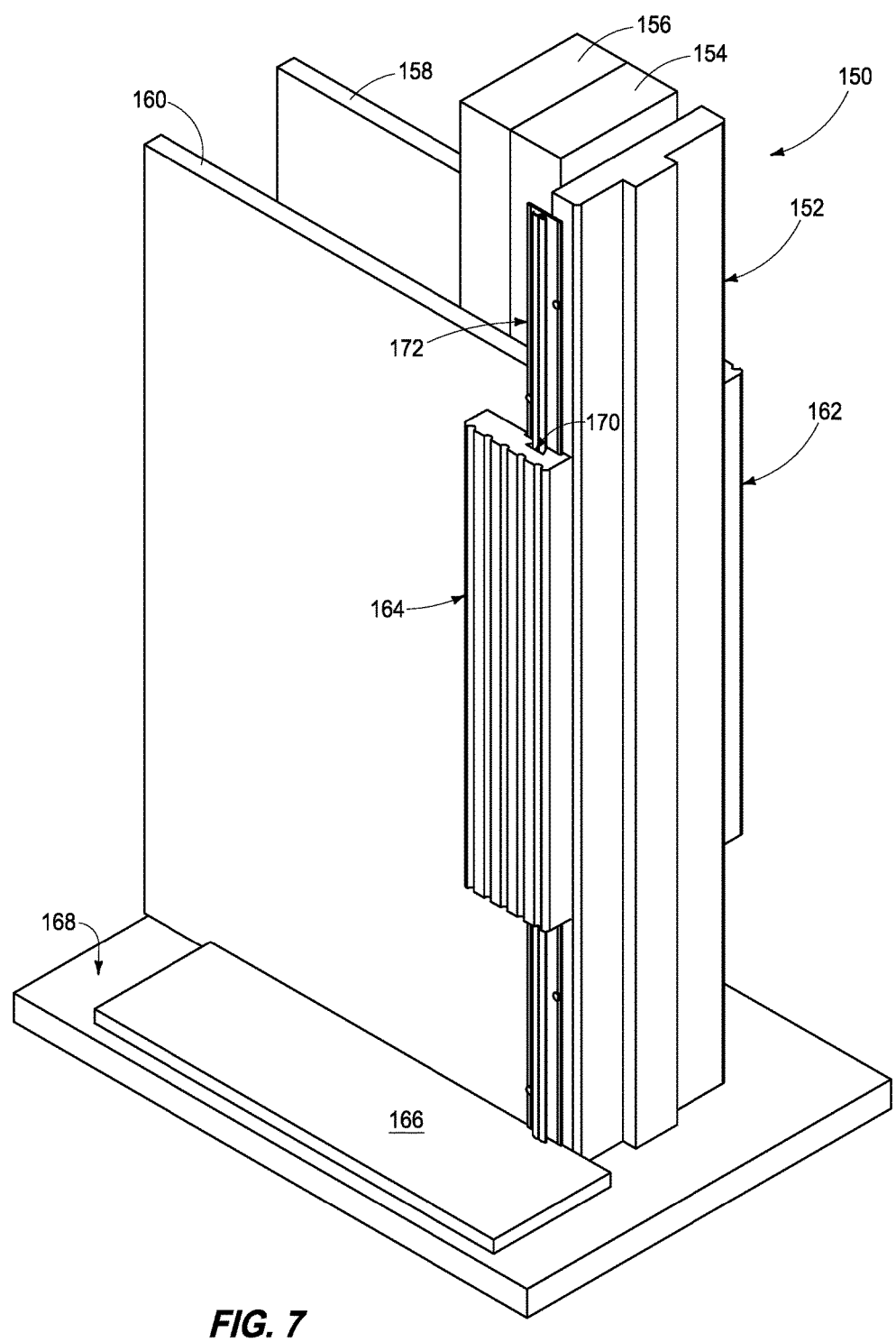
FIG. 7 is a simplified perspective view of an exemplary method of securing molding to a surface according to an embodiment of the invention.
Figure 8:
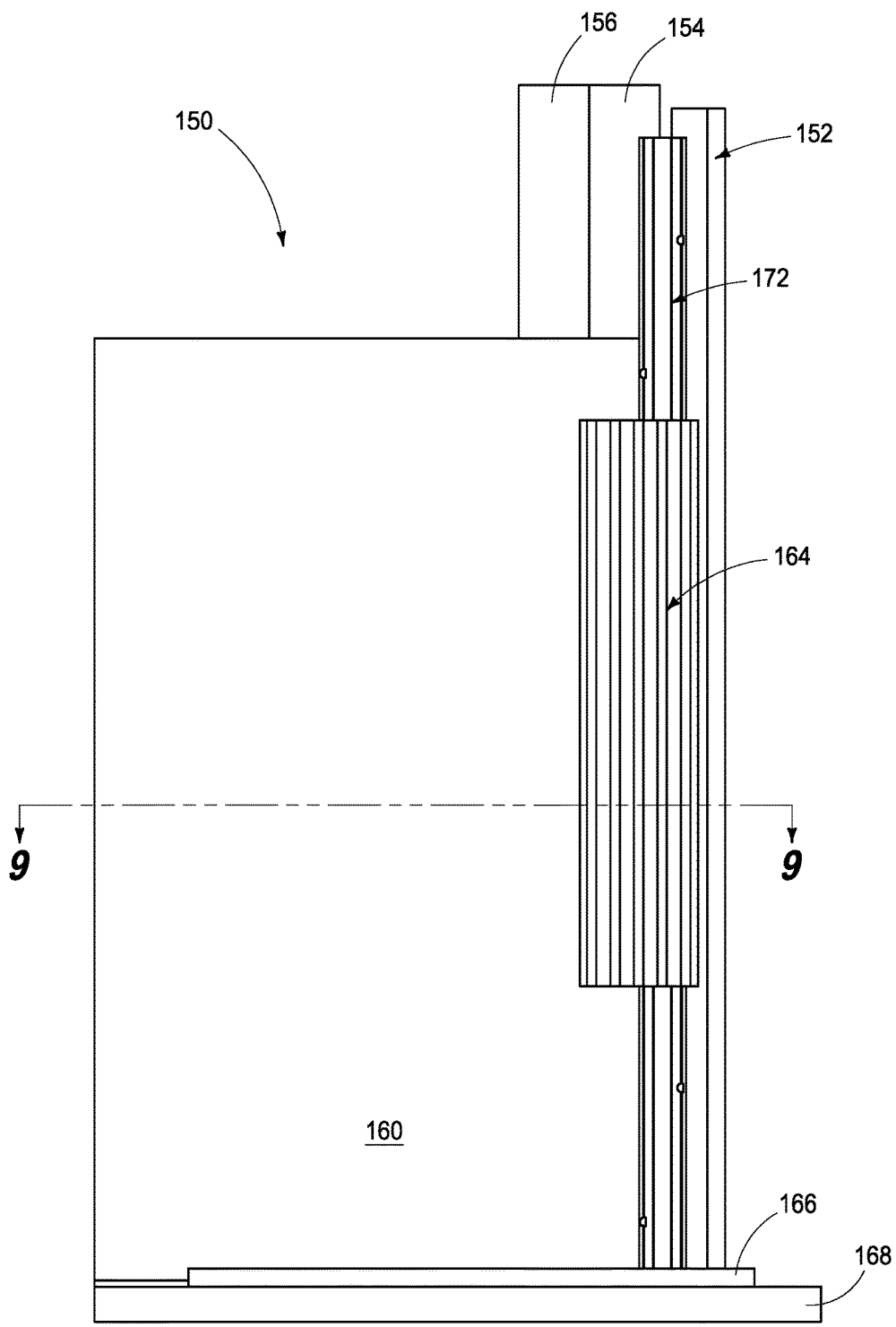
FIG. 8 is a side view of FIG. 7.
Figure 9:
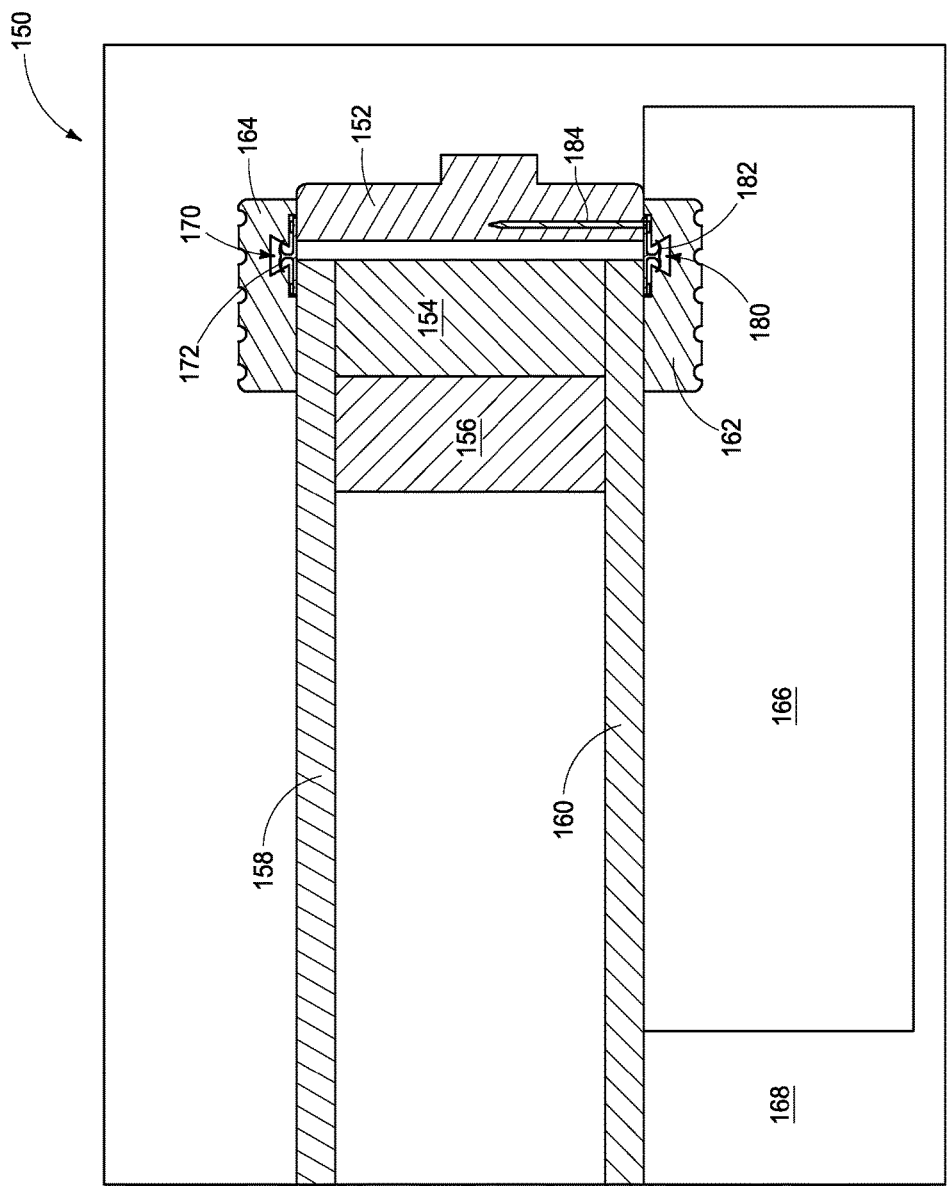
FIG. 9 is a sectional view taken along sectional lines 9-9 in FIG. 8.

Referring to FIGS. 7-9, another embodiment 150 of the invention is disclosed illustrating selectively removable (and selectively replaceable) door trims or moldings 162, 164. Door moldings 162, 164 surround opposite sides of a door jamb 152. The door molding 164 has an opening 170 to receive a securement device 172 for attaching the door molding 164 in place. An exemplary securement device 172 is configured as the securement device 104 disclosed in FIG. 5. It should be understood that any other embodiment for a securement device disclosed in this document can be used in this embodiment 150. Various support structures that routinely exist proximate a door jamb 152 are illustrated: flooring 166, sub flooring 168, first and second sheetrock 158, 160, door stud 154 and wall stud 156.

Referring to FIG. 9, door molding 162 has an opening 180 to receive securement device 182 wherein door molding 162 is attached adjacent door jamb 152. Securement devices 172, 182 are secured to door jamb 152, and/or door stud 154, by glue, cement, bolts, screws, rivets, fastening tape and/or nail 184, etc.

Figure 10:
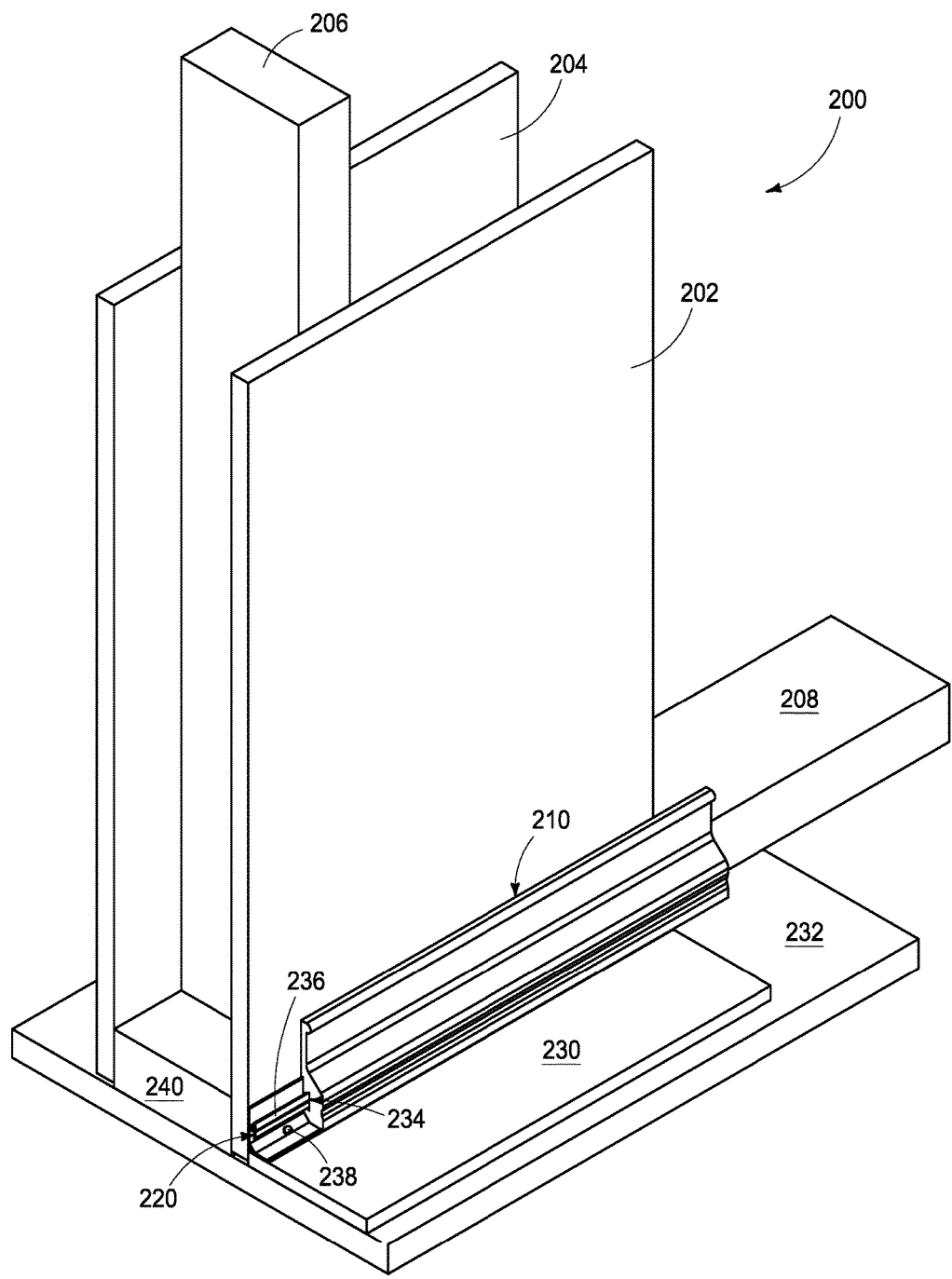
FIG. 10 is a simplified perspective view of an exemplary method of securing molding to a surface according to an embodiment of the invention.
Figure 11:
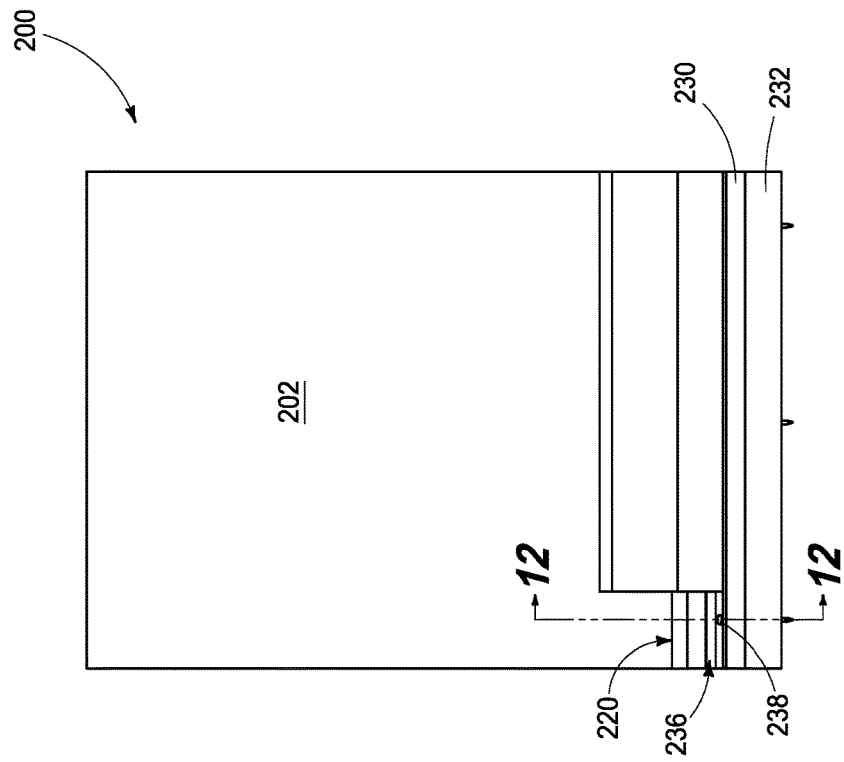
FIG. 11 is a side view of FIG. 10.
Figure 12:
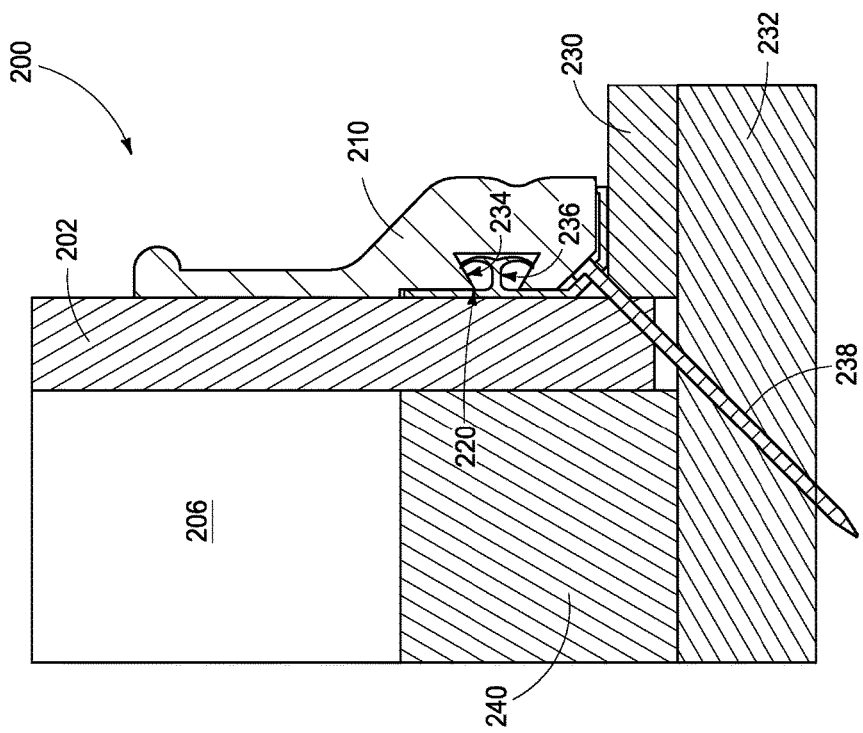
FIG. 12 is a sectional view taken along sectional lines 12-12 in FIG. 11.

Referring to FIGS. 10-12, another embodiment 200 of the invention is disclosed illustrating a selectively removable (replaceable) floor trim or molding 210 secured adjacent flooring 230. The floor molding 210 has an opening 234 to receive a securement device 220 for attaching the floor molding 210 in place. An exemplary securement device 220 is configured as the securement device 124 disclosed in FIG. 6. It should be understood that any other embodiment for a securement device disclosed in this document can be used in this embodiment 200. Various support structures that routinely exist proximate a flooring 230 are illustrated: sub flooring 232, soleplate 240/208, first and second sheetrock 202, 204 and wall stud 206. It should be understood that the securement devices 220 can be nailed 238 at any location along the first and second sheetrock 202, 204 and flooring 230.

Referring to FIG. 12, a nail 238 secures the securement device 220 to the sub flooring 232 and extends through an angled section (not referenced in this embodiment) of securement device 220 (referenced as angled section 134 for securement device 124 in FIG. 6). It should be noticed that a ridge in securement device 220 supports the floor molding 210 above flooring 232 (referenced as ridge 138 for securement device 124 in FIG. 6). The angled section (not referenced in this embodiment) of securement device 220 and the angled section 134 for securement device 124 in FIG. 6 can be a more substantial structure, that is, a thicker structure. As shown in FIG. 12, there is a space behind the angled section that includes the corner established by the intersection between first sheetrock 202 and flooring 230. The angled section of securement device 220, and the angled section 134 for securement device 124 in FIG. 6, can have a configuration and thickness that fills this space. An exemplary configuration would include the backside of the angled sections being configured as right-angled corners (instead of the planar configuration of the backside as shown) that fill the corner of intersecting first sheetrock 202 and flooring 230.

Figure 13:
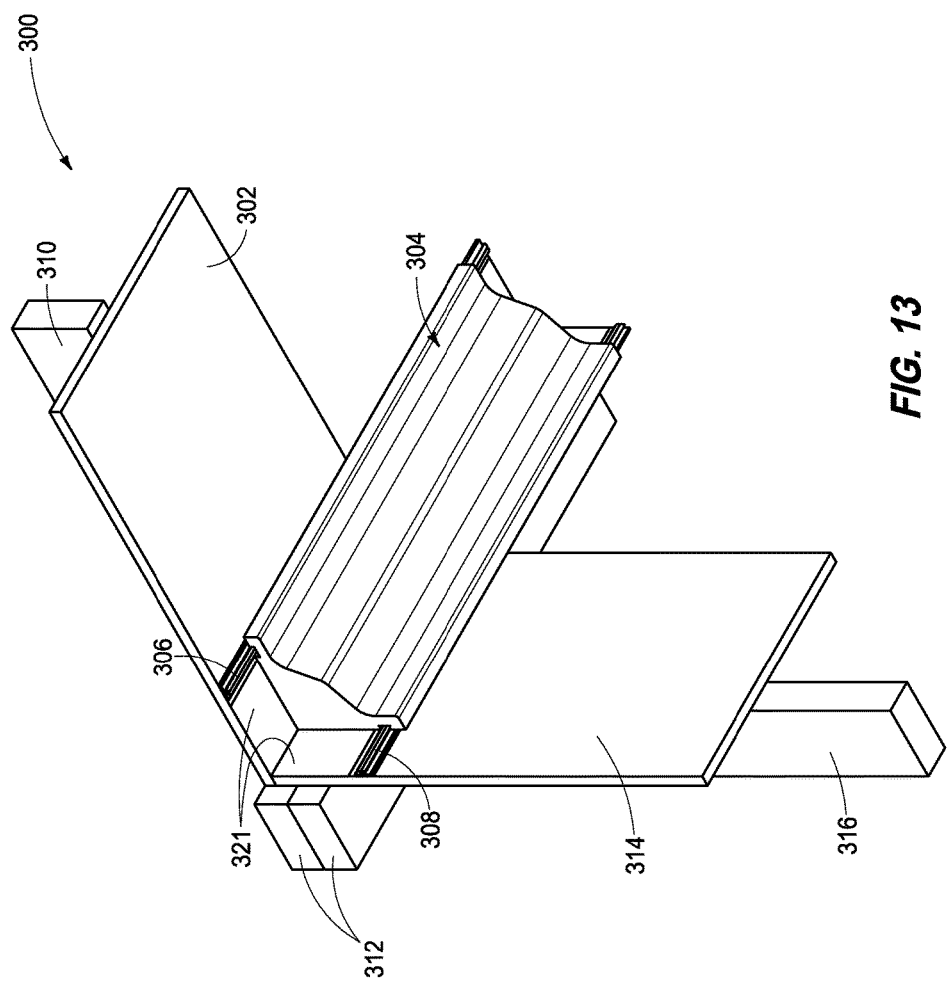
FIG. 13 is a simplified perspective view of an exemplary method of securing molding to a surface according to an embodiment of the invention.

Referring to FIGS. 13-15, another embodiment 300 of the invention is disclosed illustrating a selectively removable (replaceable) crown molding 304 secured adjacent sheetrock 302 (ceiling) and sheetrock 314 (wall). The crown molding 304 has two spaced openings 322. Each opening 322 receives a securement device 306, 308 for attaching the crown molding 304 in place. It should be understood that in this embodiment 300, securement devices 306, 308 are configured together as a single, integral structure having a L-shaped or V-shaped linking structure 321. Linking structure 321 connects (links) a portion of the securement device 306 to a portion of the securement device 308 in a single structure. In one embodiment, linking structure 321 connects (links) a base of the securement device 306 to a base of the securement device 308. The corner of linking structure 321 is placed over the corner of the intersecting sheetrock 302 (ceiling) and sheetrock 314 (wall). Material for linking structure 321 can be the same material as one, or both, of the bases of the securement devices 306, 308. This embodiment 300 has the advantage of keeping the securement devices 306, 308 in spaced alignment with the openings 322 of crown molding 304.

Still referring to FIGS. 13-15, the fastener, such as nails 320, for attaching the embodiment 300 of linking structure 321 and securement devices 306, 308 to the sheetrock 302 (ceiling) and sheetrock 314 (wall) can be provided anywhere relative to the linking structure 321. Exemplary fasteners include bolts, rivets, screws, cement, Velcro™, glue and other adhesives. It should be understood that embodiment 300 could have securement devices 306, 308 as two separate structures without including the linking structure 321. It should be further understood that any other embodiment for a securement device disclosed in this document can be used in this embodiment 300. Various support structures that routinely exist proximate a corner in a ceiling and wall are illustrated: sheetrock 314 (wall), sheetrock 302 (ceiling), wall stud 316, headers 312 and rafter (wall stud) 310. It should be understood that while securement devices 306, 308 are shown nailed 320 along the centerline of the rafter (wall stud) 310, alternatively, the securement devices 306, 308 can be positioned and nailed at any location along the sheetrock 302 (ceiling) and sheetrock 314 (wall), respectively.

Referring to FIG. 15, nails 320 secure the securement devices 306, 308 to the sheetrock 302 and sheetrock 314, respectively. It should be noticed that crown molding 304 has two rear faces that intersect at 90 (ninety) degrees to establish a corner that fits in the corner established by intersecting sheet rocks 302, 314.

Figure 18:
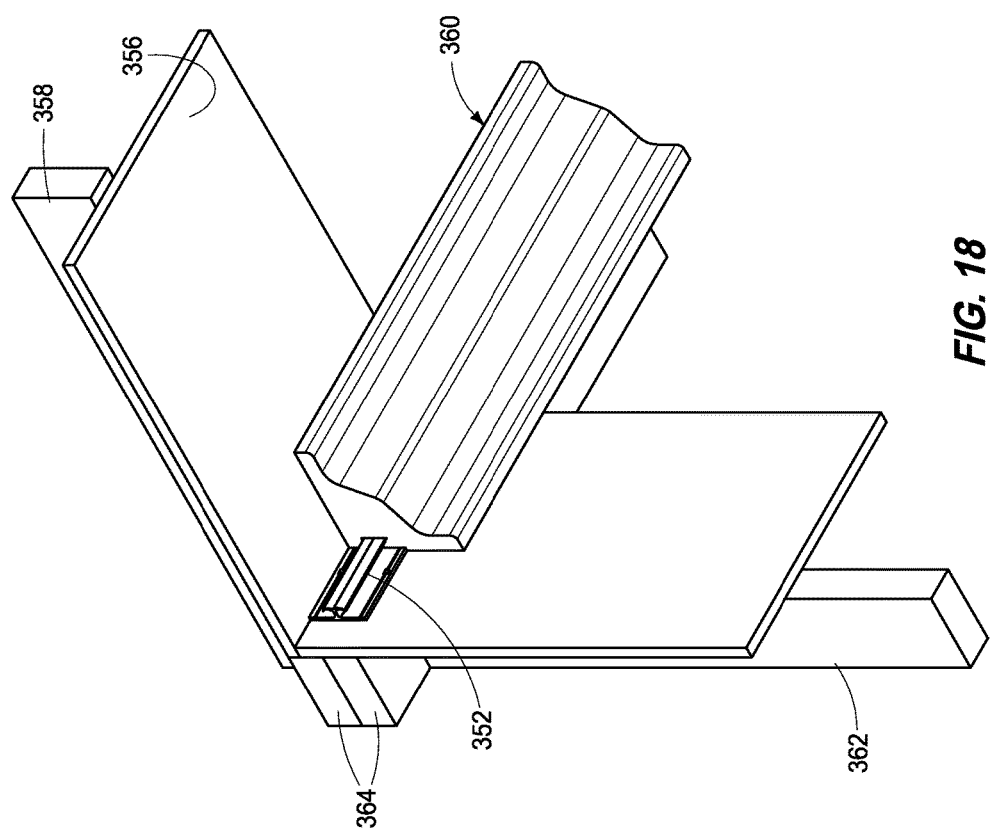
FIG. 18 is a simplified perspective view of FIG. 16.

Referring to FIGS. 16-18, another embodiment 350 of the invention is disclosed illustrating a selectively removable (replaceable) crown molding 360 secured adjacent sheetrock 356 (ceiling) and sheetrock 354 (wall). The crown molding 360 has an opening 368 to receive a securement device 352 for attaching the crown molding 360 in place. The exemplary securement device 352 is configured as the securement device 104 disclosed in FIG. 5. It should be understood that any other embodiment for a securement device disclosed in this document can be used in this embodiment 350 Various support structures that routinely exist proximate a corner in a ceiling and wall are illustrated: sheetrock 354 (wall), sheetrock 356 (ceiling), wall stud 362, headers 364 and rafter 358. It should be understood that while securement device 352 is shown nailed 366 along the centerline of the rafter (wall stud) 358, alternatively, the securement device 352 can be positioned and nailed at any location along the sheetrock 354 (wall) or sheetrock 356 (ceiling).

Referring to FIG. 17, nails 366 secure the securement device 352 to the sheetrock 354. It should be noticed that crown molding 360 has two rear faces that intersect at 90 (ninety) degrees to establish a corner that fits in the corner established by intersecting sheet rocks 354, 356.

Figure 21:
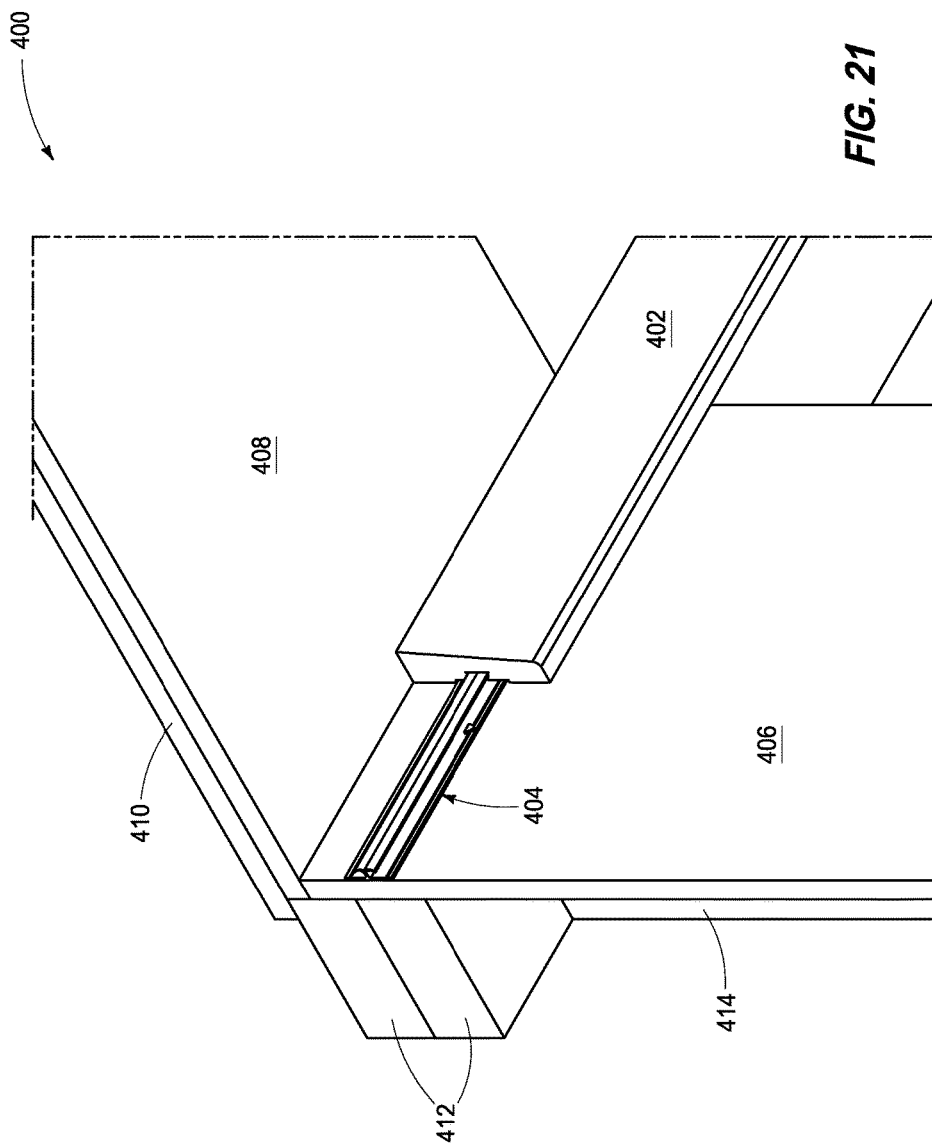
FIG. 21 is a simplified perspective view of FIG. 19.

Referring to FIGS. 19-21, another embodiment 400 of the invention is disclosed illustrating a selectively removable (replaceable) crown molding 402 secured adjacent sheetrock 408 (ceiling) and sheetrock 406 (wall). The crown molding 402 has an opening 420 to receive a securement device 404 for attaching the crown molding 402 in place. The exemplary securement device 404 is configured as the securement device 104 disclosed in FIG. 5. It should be understood that any other embodiment for a securement device disclosed in this document can be used in this embodiment 400. Various support structures that routinely exist proximate a corner in a ceiling and wall are illustrated: sheetrock 406 (wall), sheetrock 408 (ceiling), wall stud 414, headers 412 and rafter 410. It should be understood that while securement device 404 is shown nailed 416 along the centerline of the rafter (wall stud) 410, alternatively, the securement device 404 can be positioned and nailed at any location along the sheetrock 406 (wall) or sheetrock 408 (ceiling).

Referring to FIG. 20, nails 416 secure the securement device 404 to the sheetrock 406. It should be noticed that crown molding 402 has two rear faces that intersect at 90 (ninety) degrees to establish a corner that fits in the corner established by intersecting sheet rocks 406, 408.

Referring to FIGS. 22-24, another embodiment 450 of the invention is disclosed illustrating a selectively removable (replaceable) crown molding 452 secured adjacent sheetrock 454 (ceiling) and sheetrock 456 (wall). The crown molding 452 has two spaced openings. Each opening receives a securement device 468, 470 for attaching the crown molding 452 in place. Exemplary securement devices 468, 470 are configured as the securement device 104 disclosed in FIG. 5. It should be understood that any other embodiment for a securement device disclosed in this document can be used in this embodiment 450. Various support structures that routinely exist proximate a corner in a ceiling and wall are illustrated: sheetrock 456 (wall), sheetrock 454 (ceiling), wall stud 460 (FIG. 23), headers 462 and rafter 458.

Referring to FIG. 23, nails 464 secure the securement devices 468, 470 to sheetrock 456 and sheetrock 454, respectively. It should be noticed that crown molding 452 has three rear faces with a primary rear face that extends between sheet rocks 456, 454 leaving an opening or space 472 between the primary rear face and the corner established by sheet rocks 456, 454.

The trims and/or moldings discussed throughout this document can be made of various materials including wood, plaster, plastic, stone and marble. Moreover, the trims and/or moldings discussed throughout this document can be provided on any surface, including interior surfaces of buildings such as the walls of residential and business constructions.

Furthermore, the trims and/or moldings discussed throughout this document can be secured, via any securement device disclosed in this document, to any location on a wall, that is, to surround or border doorways and windows, cover intersecting surfaces, to surround bathroom and kitchen cabinets/structures, to extend along any walls and ceilings and to extend at any level or configuration, along the walls and ceilings, etc. Exemplary intersecting surfaces with trim include a wall and floor wherein the trim is routinely termed a baseboard. Additionally, intersecting surfaces with trim include a wall and ceiling wherein the trim is routinely termed crown molding.

Figure 25:
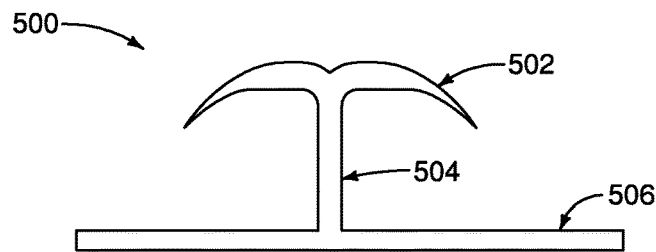
FIG. 25 is a side view of an exemplary securement device according to an embodiment of the invention.
Figure 26:
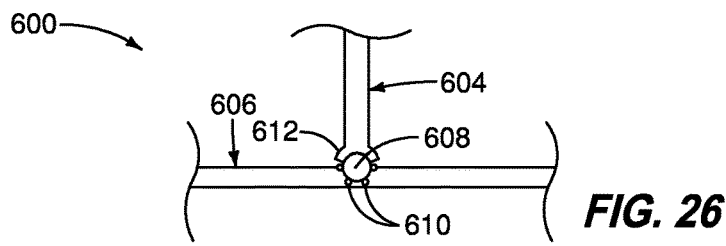
FIG. 26 is a partial side view of an exemplary securement device according to another embodiment of the invention.
Figure 27:
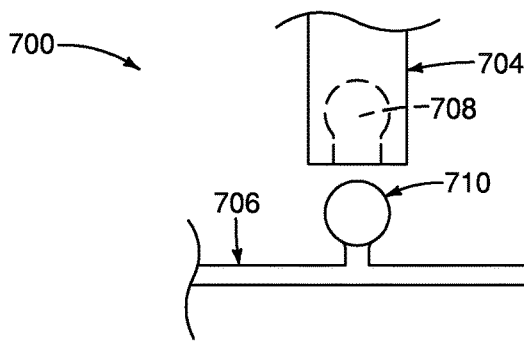
FIG. 27 is a partial side view of an exemplary securement device according to another embodiment of the invention.
Figure 28:
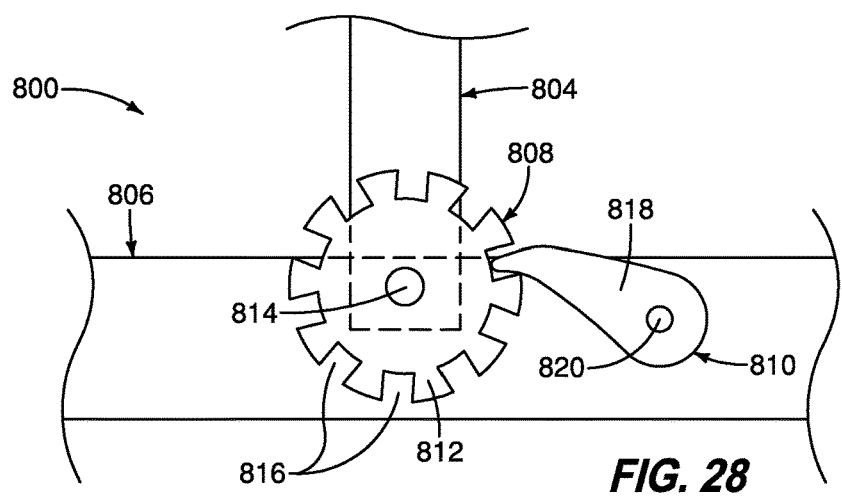
FIG. 28 is a partial side view of an exemplary securement device according to another embodiment of the invention.

Referring to FIG. 25, and to facilitate the following discussions directed to FIGS. 26-28, a side view of an exemplary one securement device 500 is disclosed and is configured similar to the previously described securement device 104 in FIG. 5. Securement device 500 has a base 506 to be secured to a surface such as a wall, as previously described, a stem 504 extending upward from base 506, as previously described, and a pair of wings 502 directed in opposite directions from a top portion of stem 504, as previously described.

An optional additional structure not shown in FIG. 25, and for which can be provided for any securement device disclosed in this document, is a collar which is a structure of material that surrounds the stem. The collar would extend between the wings and base for support or reinforcement in the securement device. An exemplary material for the collar can be any material same as the base, stem and/or wings, or a completely different material from either of the base, stem and/or wings.

Still considering various examples of securement devices having a base, stem and wings as previously described in this document, and for any securement device disclosed in this document, the following various embodiments are possible. As stated previously, any one of the base, stem and wings can be comprised of the same material, such as plastic or metal, or any one of the base, stem and wings can be comprised of a different material. Various compositions of material for any one, or any combination of, the base, stem and wings can be plastic and/or metal, and any composition of various materials. Such exemplary various materials include polymers, plastics, fiberglass, metals, stainless steel and polyethylene.

Exemplary plastics include Polyamides (PA) or (nylons), Polycarbonate (PC), Polyester (PES), Polyethylene (PE), High-density polyethylene (HDPE), Low-density polyethylene (LDPE), Polyethylene terephthalate (PET), Polypropylene (PP), Polystyrene (PS), High impact polystyrene (HIPS), Polyurethanes (PU), Polyvinyl chloride (PVC), Polyvinylidene chloride (PVDC), Acrylonitrile butadiene styrene (ABS), Polyepoxide (epoxy), Polymethyl methacrylate (PMMA) (acrylic), Polytetrafluoroethylene (PTFE), Phenolics or phenol formaldehyde (PF), Melamine formaldehyde (MF) Urea-formaldehyde (UF), Polyetheretherketone (PEEK), Maleimide/bismaleimide, Polyetherimide (PEI) (Ultem), Polyimide, Plastarch material, Polylactic acid (PLA), Furan, Silicone and Polysulfone.

As examples, base, stem and wings could all be comprised of the same metal such as stainless steel (or steel, tin, iron, copper, etc). Alternatively, base, stem and wings could all be comprised of the same plastic such as high-density polyethylene. Alternatively, base could be a high-density polyethylene while the stem and wings are low-density polyethylene (rigidity of stem and wings would be less than base). An exemplary material for any base disclosed throughout this document would include high density polyethylene or a thermoset plastic. An exemplary material for any wing configuration disclosed throughout this document would include silicone or an elastomer.

Referring to FIG. 27, a partial view of an exemplary securement device 700 is illustrated. Securement device 700 includes a press stud connection between a base 706 and a stem 704. The press stud connection has a male component 710 (stud as previously discussed) extending upward from a planar surface of the base 706. Moreover, the press stud connection has a female component 708 (opening as previously discussed) in a bottom end of the stem 704 and configured to receive the stud 710. In this configuration, the stud 710 of base 706 can be selectively pressed into the opening 708 of the stem 704 to provide the capability of selectively connecting the base 706 to the stem 704. Alternatively, the stud 710 of base 706 can be selectively pulled or released from the opening 708 of the stem 704 to provide the capability of selectively disconnecting the base 706 from the stem 704.

The base could be a metal, the stem could be a high-density polyethylene and the wings could be a low-density polyethylene. In this embodiment, the connection between the base and stem is a press stud connection, and the connection between the stem and wings is a press stud connection. In this embodiment, the pair of wings can be a single structure, and alternatively, the pair of wings can be two separate structures with each wing connected to the stem with either a single, or a combination of, a press stud connection. Accordingly, the base and stem is a press stud connection with either the base or stem having the stud and the other of the base and stem having the opening. If the wings are a single structure, a bottom portion of the wings can have either the stud or the opening with the stem having the other of the stud or the opening. If the wings are separate structures, the stem can have one, or two, studs or openings. For example, if stem has one stud, the two wings are connected together by a press stud connection (one with stud and one with opening) and then a bottom portion of the pair of wings has an opening to receive the stud. Alternatively, and still wherein the wings are separate structures, the stem has two studs on opposite sides of the top portion of stem, each end of the wings has corresponding opening to receive one of the studs on the stem.

Referring to FIG. 26, it should be further understood that any securement device 600 disclosed in this document can have discrete structures that pivot or rotate relative to other discrete structures. For example, securement device 600 includes a stem 604 having a lower portion 612 affixed to an axle 608 (or shaft, spindle, pin) and the axle 608 is pivotably secured to a base 606 via bearings 610. This configuration of securement device 600 provides the capability of the stem 604 to pivot or rotate relative to the base 606.

Alternatively, or in combination, the stem could have the capability to pivot or rotate relative to the wings wherein an axle (or shaft, spindle, pin) will extend through a top portion of the stem and through a bottom ridge extending from a central location of the wings. Still further and alternatively, or in combination, one wing of at least a pair of wings could have the capability to pivot or rotate relative to the other wings, or rest of the structure of the securement device, wherein an axle (or shaft, spindle, pin) will extend through an intersection structure between the wings.

Still further, referring to FIG. 28, it should be further understood that any securement device 800 disclosed in this document can have discrete structures that pivot or rotate relative to other discrete structures and that the discrete structures can be held or locked in place at a preselected pivoted angle relative to the other discrete structures. For example, the securement device 800 has a base 806 and stem 804, and as one non-limiting example only, the stem 804 will have the capability to rotate relative to the base 806 on a pin 814. Additionally, the stem 804 can be held in place at a preselected angle relative to the base 806 by a ratchet mechanism 808/810.

Still referring to FIG. 28, a ratchet mechanism 808/810 is clearly understood by one skilled in the art. An exemplary ratchet mechanism is shown and described at https://en.wikipedia.org/wiki/Ratchet (device). The ratchet mechanism 808/810 will allow rotary motion of the stem 804 relative to the base 806 wherein ultimately, if molding (not shown) is secured to the wings (not shown) on top of the stem 804, then the molding can be rotated, and held in place, at a preselected angle relative to the base 806. This allows the benefit/advantage of being able to adjust the angle of the molding relative to a surface such as a wall, ceiling or floor.

Still referring to FIG. 28, the pin 814 extends through the lower portion of the stem 804 and through the base 806. A gear 808 is secured to a side of the stem 804 and rotates with the rotation of the stem 804. The gear 808 has divots 816 (indentations or depressions or dents) intermittently spaced around the circular periphery 812 of the gear 808. A spring-loaded pawl 810 on a pivot pin 820 is configured as an arm 818 that engages the divots 816 to lock the gear 808 and stem 804 in place which ultimately locks into place (at the preselected angle) any structure directly, or indirectly, secured to the gear 808 and stem 804 such as molding. The pawl 810 is pivotally coupled to the base 806 by the pivot pin 820. It should be further understood that the wings (not shown), collectively, will be selectively angled and locked into place by the ratchet mechanism 808/810. Still further, one wing can be selectively angled and locked into place, by a ratchet mechanism, relative to other wings and/or the rest of the structure in the securement device.

Still referring FIG. 28, and in one embodiment, the pawl 810 is spring biased toward the gear 808. If it is desired to change the relative angle between discrete structures in the securement device 800 that can pivot and have a ratchet mechanism, then the pawl 810 is lifted (against the spring action) from the divot 816 in the gear 808 and the pivotable structure (in this embodiment, the stem 804) is rotated to another preselected position relative to other structures (in this embodiment, at least the base 806) in the securement device 800.

Non-limiting dimensions for any trim disclosed in this document and non-limiting dimensions for any securement device disclosed in this document include: a trim having a width of 14 mm and a height of 38 mm could be secured to a surface by a securement device having a width of 10 mm and a height of 25 mm. Considering the securement device 500 of FIG. 25, wings 502 could be approximately 6 mm above the upper surface of base 506 and wings 502 could have a width (from tip to tip) of approximately 12 mm. Larger dimensioned trims may have larger dimensioned securement devices.

In compliance with the statute, the various embodiments have been described in language more or less specific as to structural and methodical features. It is to be understood, however, that the various embodiments are not limited to the specific features shown and described, since the means herein disclosed comprise disclosures of putting the various embodiments into effect. The various embodiments are, therefore, claimed in any of its forms or modifications within the proper scope of the appended claims appropriately interpreted in accordance with the doctrine of equivalents.

What is claimed is:

1. A securement device for securing molding to a surface, the securement device comprising:

a base to be attached to a surface and comprising a first planar structure;

a stem extending directly from the first planar structure of the base;

a pair of flexible curved structures extending laterally from opposite sides of the stem toward the base; and wherein at least one of the base, stem and pair of flexible curved structures comprises a ratchet mechanism.

2. The securement device of claim 1 wherein at least one of the base, the stem and the pair of flexible curved structures is a discrete and separate structure and is removably secured to an adjacent structure.

3. The securement device of claim 2 wherein the at least one of the base, stem and pair of flexible curved structures is connected to an adjacent structure by a press stud connection.

4. The securement device of claim 3 wherein the press stud connection comprises a stud extending upward from the base and a lower end of the stem has an opening configured to receive the stud.

5. The securement device of claim 1 wherein at least one of the base, stem and pair of flexible curved structures has pivoting capability relative to an adjacent structure.

6. The securement device of claim 1 wherein the pair of curved structures comprises a composition of material having a rigidity value and wherein the base and stem have rigidity values greater than the rigidity value of the pair of curved structures.

7. The securement device of claim 1 wherein the base is attached to a surface by fastening tape comprising nylon hooks.

8. The securement device of claim 1 wherein the first planar structure of the base comprises a first edge, and further comprising a second planar structure extending from the first edge of the base.

9. The securement device of claim 8 wherein the second planar structure comprise a second edge, and further comprising a ridge extending from the second edge.

10. The securement device of claim 8 further comprising a third planar structure extending between the first and second planar structures.

11. The securement device of claim 1 further comprising at least one of the following structures:
a press stud; and
an axle with bearings.

12. A method of securing molding to a surface, the method comprising:
attaching a strip of flexible material to a surface, the strip of flexible material comprising a pair of curved structures extending in opposite directions and curving toward the surface;
providing molding comprising a rear side opposite a front side, an opening extends into the molding from the rear side, the opening having a smallest cross section dimension at the rear side and an increasing cross section dimension as the opening extends from the rear side toward the front side, the opening defining opposite sides in the molding;
aligning the opening of the molding over the pair of curved structures of the strip of flexible material; and securing the molding to the surface by applying pressure to the front side of the molding toward the surface until the curved structures enter the opening with terminal ends of the curved structures biased against the opposite sides of the opening.

13. The method of claim 12 wherein the opening in the molding comprises a dovetail configuration.

14. The method of claim 12 wherein the strip of flexible material further comprises:
a base that is secured to the surface; and
a stem extending upward from the base, an end of the stem opposite the base supporting the pair of curved structures.

15. The method of claim 14 further comprising removing the stem from the base.

16. The method of claim 12 further comprising, after securing the molding to the surface, pivoting the molding relative to the surface.

17. The method of claim 12 further comprising, after securing the molding to the surface:
pivoting the molding at an angle relative to the surface; and
locking the molding in place at the angle relative to the surface.

18. A securement device for securing molding to a surface, the securement device comprising:
a base to be attached to a surface and comprising a first planar structure;
a stem extending directly from the first planar structure of the base;
a pair of flexible curved structures extending laterally from opposite sides of the stem toward the base;
wherein at least one of the base, the stem and the pair of flexible curved structures is a discrete and separate structure and is removably secured to an adjacent structure;
wherein the at least one of the base, stem and pair of flexible curved structures is connected to an adjacent structure by a press stud connection; and
wherein the press stud connection comprises a stud extending upward from the base and a lower end of the stem has an opening configured to receive the stud.

19. A securement device for securing molding to a surface, the securement device comprising:
a base to be attached to a surface and comprising a first planar structure;
a stem extending directly from the first planar structure of the base;
a pair of flexible curved structures extending laterally from opposite sides of the stem toward the base; and
wherein the first planar structure of the base comprises a first edge, and further comprising a second planar structure extending from the first edge of the base.

20. The securement device of claim 19 wherein the second planar structure comprise a second edge, and further comprising a ridge extending from the second edge.

21. The securement device of claim 19 further comprising a third planar structure extending between the first and second planar structures.

* * * * *